(12) United States Patent
Teng et al.

(10) Patent No.: US 11,689,878 B2
(45) Date of Patent: Jun. 27, 2023

(54) AUDIO ADJUSTMENT BASED ON USER ELECTRICAL SIGNALS

(71) Applicant: QUALCOMM Incorporated, San Diego, CA (US)

(72) Inventors: Diyan Teng, Santa Clara, CA (US); Junsheng Han, Los Altos Hills, CA (US); Rashmi Kulkarni, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/467,883

(22) Filed: Sep. 7, 2021

(65) Prior Publication Data

US 2023/0075488 A1 Mar. 9, 2023

(51) Int. Cl.
 H04S 7/00 (2006.01)
 G06F 3/01 (2006.01)
 H04R 5/04 (2006.01)
 H04R 5/02 (2006.01)

(52) U.S. Cl.
 CPC .............. H04S 7/303 (2013.01); G06F 3/013 (2013.01); G06F 3/015 (2013.01); H04R 5/02 (2013.01); H04R 5/04 (2013.01); H04S 2400/11 (2013.01)

(58) Field of Classification Search
 CPC ...... H04S 7/303; H04S 2400/11; G06F 3/013; G06F 3/015; H04R 5/02; H04R 5/04
 See application file for complete search history.

(56) References Cited

U.S. PATENT DOCUMENTS

| 2013/0041648 | A1  | 2/2013  | Osman   |              |
|--------------|-----|---------|---------|--------------|
| 2015/0245156 | A1  | 8/2015  | Tsang   |              |
| 2020/0007993 | A1* | 1/2020  | Lyon    | H04R 25/505  |
| 2020/0329322 | A1  | 10/2020 | Ramsay  |              |
| 2020/0401226 | A1* | 12/2020 | Song    | A61B 5/7455  |
| 2021/0100509 | A1* | 4/2021  | Villada | A61B 5/4806  |
| 2021/0259635 | A1* | 8/2021  | Remes   | A61B 5/369   |

OTHER PUBLICATIONS

Bednar A., et al., "Where is the Cocktail Party? Decoding Locations of Attended and Unattended Moving sound Sources Using EEG", Oct. 17, 2019, https://doi.org/10.1016/j.neuroimage.2019.116283, 10 Pages.
Favre-Felix A., et al., "Absolute Eye Gaze Estimation with Biosensors in Hearing Aids", 10.3389/fnins.2019.01294, Dec. 5, 2019, 11 Pages.

(Continued)

*Primary Examiner* — Andrew L Sniezek
(74) *Attorney, Agent, or Firm* — Qualcomm Incorporated

(57) ABSTRACT

A device includes a memory and one or more processors. The memory is configured to store instructions. The one or more processors are configured to execute the instructions to obtain electrical activity data corresponding to electrical signals from one or more electrical sources within a user's head. The one or more processors are also configured to execute the instructions to render, based on the electrical activity data, audio data to adjust a location of a sound source in a sound field during playback of the audio data.

30 Claims, 10 Drawing Sheets

(56) References Cited

OTHER PUBLICATIONS

Nguyen A., et al., "A Lightweight and Inexpensive In-ear Sensing System for Automatic Whole-night Sleep Stage Monitoring", SenSys '16, Nov. 14-16, 2016, DOI: http://dx.doi.org/10.1145/2994551.2994562, 15 Pages.

Vandecappelle S., et al., "EEG-Based Detection of the Locus of Auditory Attention with Convolutional Neural Networks", Mar. 18, 2021, 20 Pages.

International Search Report and Written Opinion—PCT/US2022/073199—ISA/EPO—dated Oct. 24, 2022.

\* cited by examiner

US 11,689,878 B2

AUDIO ADJUSTMENT BASED ON USER ELECTRICAL SIGNALS

I. FIELD

The present disclosure is generally related to adjusting audio based on user electrical signals.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to playback spatial audio with sounds that can be perceived as coming from a direction of an audio source. The direction of the audio source is typically mapped to the playback device. As an example, the audio may represent speech of a character that is perceived to be coming from in front of a user looking at the playback device. However, if the user puts the playback device on a desk, the speech is perceived as coming from the desk instead of in front of the user.

III. SUMMARY

According to one implementation of the present disclosure, a device includes a memory and one or more processors. The memory is configured to store instructions. The one or more processors are configured to execute the instructions to obtain electrical activity data corresponding to electrical signals from one or more electrical sources within a user's head. The one or more processors are also configured to execute the instructions to render, based on the electrical activity data, audio data to adjust a location of a sound source in a sound field during playback of the audio data.

According to another implementation of the present disclosure, a method includes obtaining, at a device, electrical activity data corresponding to electrical signals from one or more electrical sources within a user's head. The method also includes rendering, based on the electrical activity data, audio data to adjust a location of a sound source in a sound field during playback of the audio data.

According to another implementation of the present disclosure, a non-transitory computer-readable medium includes instructions that, when executed by one or more processors, cause the one or more processors to obtain electrical activity data corresponding to electrical signals from one or more electrical sources within a user's head. The instructions, when executed by the one or more processors, cause the one or more processors to render, based on the electrical activity data, audio data to adjust a location of a sound source in a sound field during playback of the audio data.

According to another implementation of the present disclosure, an apparatus includes means for obtaining electrical activity data corresponding to electrical signals from one or more electrical sources within a user's head. The apparatus also includes means for rendering, based on the electrical activity data, audio data to adjust a location of a sound source in a sound field during playback of the audio data.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

During playback of spatial audio, sounds can be perceived as coming from a direction of an audio source that is mapped to a playback device. As an example, the audio may represent speech of a character that is perceived as coming from in front of a user looking at the playback device. However, if the user or the playback device changes position such that the playback device is no longer in front of the user, the speech is perceived as coming from the playback device that is not in front of the user.

Systems and methods of adjusting audio based on user electrical signals are disclosed. An audio player can render audio data to include multiple locations of a sound source in a sound field during a first playback operation. For example, a user listening to playback of the rendered audio data during the first playback operation would perceive sounds from the same sound source coming from each of the multiple locations in the sound field at the same time. To illustrate, the user would perceive the sounds as if the same sound source is replicated at each of the multiple locations. The audio player obtains electrical activity data corresponding to electrical signals generated from electrical sources (e.g., brain cells) within a user's head during the first playback operation. As an example, the electrical activity data includes electroencephalogram (EEG) data received from an in-ear sensor. The audio player identifies, based on the electrical activity data, one of the multiple locations as a user preferred location of the sound source. The audio player renders the audio data based on the user preferred location to adjust a location of the sound source during a second playback operation. For example, the user listening to playback of the rendered audio data during the second playback operation would perceive sound from the sound source coming from the user preferred location in the sound field. The audio player thus enables the direction of the sound source to be adjusted based on user preference instead of being mapped to the playback device.

Figure 1:
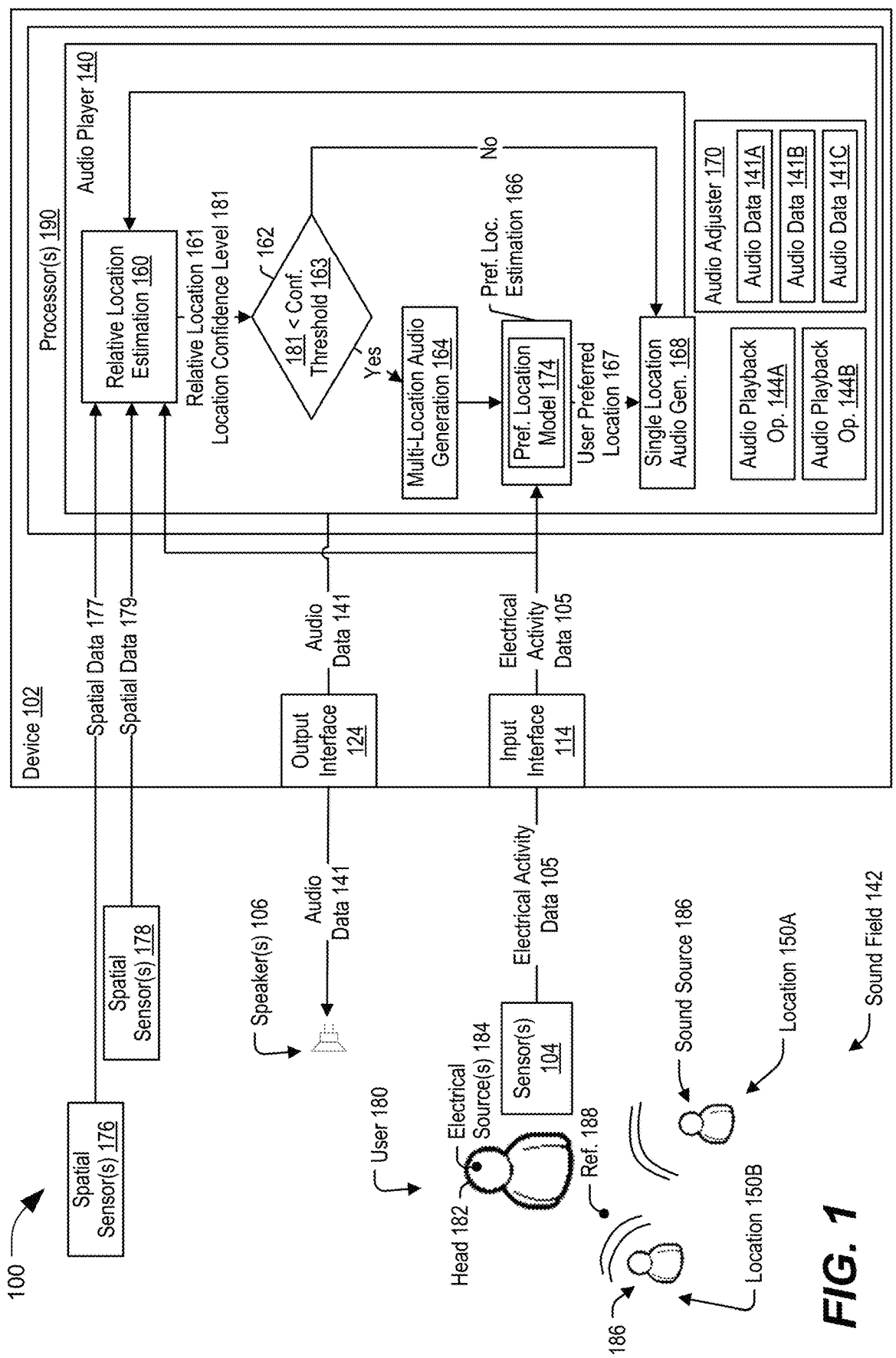
FIG. 1 is a block diagram of a particular illustrative aspect of a system operable to adjust audio based on user electrical signals, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple locations are illustrated and associated with reference numbers 150A and 150B. When referring to a particular one of these locations, such as a location 150A, the distinguishing letter "A" is used. However, when referring to any arbitrary one of these locations or to these locations as a group, the reference number 150 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to adjust audio based on user electrical signals is disclosed and generally designated 100. The system 100 includes a device 102 that is configured to be coupled via an output interface 124 to one or more speakers 106.

The device 102 is configured to be coupled via an input interface 114 to one or more sensors 104. In a particular aspect, the one or more sensors 104 include an in-ear sensor, an electrode cap, a neural implant, a conductive screen, a non-wearable sensor, or a combination thereof. The device 102 is configured to be coupled to one or more spatial sensors 176 configured to generate spatial data 177 indicating spatial information (e.g., at least one of movement, position, or orientation) of the user 180. In a particular aspect, the one or more spatial sensors 176 include an inertial measurement unit (IMU), a camera, a global positioning system (GPS) sensor, or a combination thereof.

In some aspects, the spatial data 177 (e.g., IMU data, image data, or both) indicates a change in location of the user 180, a change in orientation of the user 180, or both. For example, an IMU of the one or more spatial sensors 176 integrated in a headset worn by the user 180 generates IMU data indicating movement of the headset corresponding to movement of the head 182 of the user 180. The spatial data 177 includes the IMU data.

In some aspects, the spatial data 177 (e.g., GPS data, image data, or both) indicates a location, an orientation, or both, of the user 180. For example, a camera of the one or more spatial sensors 176 captures a first image of the user 180 at a first time and a second image of the user 180 at a second time. The first image indicates a first orientation of the head 182 at the first time and the second image indicates a second orientation of the head 182 at the second time. The spatial data 177 includes the first image and the second image indicating the first orientation at the first time and the second orientation at the second time, and also indicating a change in orientation from the first orientation to the second orientation.

The device 102 is configured to be coupled to one or more spatial sensors 178 configured to generate spatial data 179 indicating spatial information (e.g., at least one of movement, position, or orientation) of the reference 188. In a particular aspect, the one or more spatial sensors 178 include an IMU, a camera, a GPS sensor, or a combination thereof. In some aspects, the spatial data 179 (e.g., IMU data, image data, or both) indicates a change in location of the reference 188, a change in orientation of the reference 188, or both. In some aspects, the spatial data 179 (e.g., GPS data, image data, or both) indicates a location, an orientation, or both, of the reference 188. In some aspects, the reference 188 has a fixed location, a fixed orientation, or both. In these aspects, the spatial data 179 can indicate the fixed location, the fixed orientation, or both. For example, the spatial data 179 can be based on a configuration setting, default data, user input, or a combination thereof, indicating the fixed location, the fixed orientation, or both, as compared to being generated by the one or more spatial sensors 178. The device 102 is configured to adjust audio based on user electrical signals using an audio player 140.

In some implementations, one or more components of the system 100 are included in the device 102 and one or more components of the system 100 are included in a second device that is configured to be coupled to the device 102. In an illustrative non-limiting example, the audio player 140 is included in the device 102 (e.g., a phone, a tablet, a gaming console, a computing device, etc.), and the one or more spatial sensors 176, the one or more speakers 106, the one or more sensors 104, or a combination thereof are included in a second device (e.g., a user head-mounted device, such as a headset of the user 180).

The one or more sensors 104 are configured to generate electrical activity data 105 corresponding to electrical signals (e.g., brain waves) from one or more electrical sources 184 (e.g., brain cells) within the head 182 of a user 180. In a particular aspect, the electrical activity data 105 includes electro-oculogram (EOG) data, EEG data, or both. The input interface 114 is configured to receive the electrical activity data 105 from the one or more sensors 104. In a particular aspect, the input interface 114 includes at least one of an ethernet interface, a universal serial bus (USB) interface, a Wi-Fi interface, a Bluetooth® (a registered trademark of Bluetooth SIG, Inc., Washington) interface, a serial port interface, a parallel port interface, or other type of data interface.

The device 102 includes one or more processors 190. In a particular aspect, the input interface 114, the output interface 124, or both, are coupled to the one or more processors 190. The one or more processors 190 include the audio player 140. In a particular aspect, the audio player 140 includes an audio adjuster 170 configured to adjust audio data. In a particular aspect, audio data 141A corresponds to sounds captured by one or more microphones. In a particular aspect, the audio data 141A corresponds to audio generated by a gaming engine, an audio application, etc. In a particular aspect, the audio data 141A corresponds to a combination of captured and virtual sounds. The audio data 141A represents a sound field 142 (e.g., a three-dimensional (3D) sound field). During playback of the audio data 141A, the sound field 142 (e.g., the 3D sound field) can be reconstructed in a manner that enables a listener to distinguish the position and/or distance between the listener and one or more sound sources of the 3D sound field.

In an illustrative non-limiting example, the audio data 141A is based on or converted to one of these formats: (i) traditional channel-based audio, which is meant to be played through loudspeakers at pre-specified positions; (ii) object-based audio, which involves discrete pulse-code-modulation (PCM) data for single audio objects with associated metadata containing their location coordinates (amongst other information); or (iii) scene-based audio, which involves representing the sound field using coefficients of spherical harmonic basis functions (also called "spherical harmonic coefficients" or SHC, "Higher-order Ambisonics" or HOA, and "HOA coefficients").

The audio player 140 is configured to perform multi-location audio generation 164. For example, the audio adjuster 170 is configured to generate audio data 141B by rendering audio data 141A to have sounds of a sound source 186 corresponding to multiple locations 150 of the sound field 142. The audio player 140 is configured to output the audio data 141B to the one or more speakers 106 during an audio playback operation 144A. The one or more sensors 104 are configured to generate electrical activity data 105 during the audio playback operation 144A. The audio player 140 is configured to determine a user preferred location 167 by performing a preferred location estimation (pref. loc. estimation) 166 based on the electrical activity data 105. The audio player 140 is configured to perform single location audio generation (single location audio gen.) 168 based on the user preferred location 167. For example, the audio adjuster 170 is configured to generate audio data 141C by rendering the audio data 141A based on the user preferred location 167 to adjust the location of the sound source 186 in the sound field 142.

In some implementations, the device 102 corresponds to or is included in one of various types of devices. In an illustrative example, the one or more processors 190 are integrated in a headset device that includes the one or more speakers 106 and includes or is coupled to the one or more sensors 104, such as described further with reference to FIG. 6. In other examples, the one or more processors 190 are integrated in at least one of a mobile phone or a tablet computer device, as described with reference to FIG. 5, a wearable electronic device, as described with reference to FIG. 7, a voice-controlled speaker system, as described with reference to FIG. 8, a virtual reality, mixed reality, or augmented reality headset, as described with reference to FIG. 9, one or more earbuds, as described with reference to FIG. 11. In another illustrative example, the one or more processors 190 are integrated into a vehicle that is coupled to the one or more speakers 106 and the one or more sensors 104, such as described further with reference to FIG. 10.

During operation, the user 180 activates or initiates an operation of the audio player 140 to playback audio data 141A. The audio data 141A corresponds to spatial audio data that represents at least sounds of a sound source 186 (e.g., speech of a person, sounds from a bird, music from a musical instrument, etc.) from a location 150A in the sound field 142. For example, during playback of the audio data 141A, the sound field 142 can be reconstructed such that sounds from the sound source 186 would be perceived by a listener as coming from the location 150A in the sound field 142 (e.g., a 3D space). To illustrate, speech from an actor (e.g., for movie audio or an audio book) can be perceived to be coming from in front of the listener and sounds from a passing car can be perceived to be going from right to left behind the listener. The audio data 141A can represent additional sounds from one or more additional sound sources in the sound field 142.

The audio player 140 is configured to adjust the location of the sound source 186 in the sound field 142 based on a user preferred location 167 or based on a relative location 161 (e.g., an estimated location of the user 180 relative to a reference 188). For example, the relative location 161 corresponds to an estimation (or a substitute) of the user preferred location 167. Determining the user preferred location 167 includes playing back audio to the user 180 with sounds of the sound source 186 perceptible from multiple locations 150 of the sound field 142. On the other hand, the relative location 161 can be estimated in the background without awareness of the user 180. In some implementations, the audio player 140 adjusts the location of the sound source 186 based on the relative location 161 when a location confidence level 181 of the relative location 161 is greater than or equal to a confidence threshold (conf. threshold) 163. However, when the location confidence level 181 is less than the confidence threshold 163, the audio player 140 determines the user preferred location 167 by playing back audio with sounds of the sound source 186 from the multiple locations 150, and adjusts the location of the sound source 186 based on the user preferred location 167. The sounds of the sound source 186 are thus selectively played back from the multiple locations 150 to determine the user preferred location 167 when the location confidence level 181 fails to satisfy the confidence threshold 163.

In a particular aspect, the audio player 140 performs relative location estimation 160 based on the spatial data 177, the spatial data 179, the electrical activity data 105, or a combination thereof to determine the relative location 161 and the location confidence level 181, as further described with reference to FIGS. 2A-2B. For example, the relative location 161 corresponds to an estimated location of the user 180 relative to the reference 188 and the location confidence level 181 indicates an estimation confidence associated with the relative location 161. In some implementations, the relative location 161 corresponds to an estimated position (e.g., location, orientation, or both) of the user 180 relative to an estimated position (e.g., location, orientation, or both) of the reference 188.

In a particular aspect, the reference 188 includes one or more of the device 102, a display device, a playback device, the one or more speakers 106, a physical reference, a virtual reference, a fixed location reference, or a mobile reference. For example, the reference 188 can include a virtual reference (e.g., a building) that has a fixed location in a virtual scene. As another example, the reference 188 can include a virtual reference (e.g., a mobile virtual character) that is capable of changing locations in the virtual scene. In some examples, the reference 188 can include a physical reference (e.g., an advertisement display) that has a fixed location (e.g., attached to a wall) in a physical space. In other examples, the reference 188 can include a physical reference (e.g., a mobile device) that is capable of changing locations in a physical space.

The reference 188 is illustrated as separate from the device 102 as an illustrative example. In other examples, the reference 188 can be integrated in the device 102. In some implementations, the reference 188 refers to a reference point (e.g., a particular location). In other implementations, the reference 188 can have a multi-dimensional (e.g., two-dimensional or three-dimensional) shape, such as a square, a cube, a rectangle, a plane, a prism, a triangle, a pyramid, a circle, a sphere, an oval, an ovoid, etc.

In a particular implementation, the audio player 140 initializes the relative location 161 to correspond to the reference 188 (e.g., a mobile phone screen) oriented in front of (e.g., facing) the user 180 at a predetermined distance (e.g., 12 inches) from the user 180. In a particular aspect, the predetermined distance is based on a configuration setting, a default value, user input, or a combination thereof. In a particular aspect, the audio player 140 initializes the location confidence level 181 to less than a confidence threshold 163. In a particular aspect, the confidence threshold 163 is based on a configuration setting, a default value, user input, or a combination thereof. In some aspects, the audio player 140 updates the relative location 161 and the location confidence level 181 based on movement of the reference 188, movement of the user 180, or both, as further described with reference to FIGS. 2A-2B.

The audio player 140 performs a comparison 162 to determine whether to use the relative location 161 for the single location audio generation 168 or to determine the user preferred location 167. For example, the audio player 140 compares the location confidence level 181 to the confidence threshold 163. The audio player 140, in response to determining that the location confidence level 181 is greater than or equal to the confidence threshold 163, proceeds to the single location audio generation 168 based on the relative location 161, as further described with reference to FIGS. 2A-2B. For example, the audio adjuster 170 generates audio data 141C based on the audio data 141A and the relative location 161. To illustrate, generating the audio data 141C includes rendering the audio data 141A based on the relative location 161.

Alternatively, the audio player 140, in response to determining that the location confidence level 181 is less than the confidence threshold 163, performs multi-location audio generation 164 to determine the user preferred location 167.

In some aspects, the comparison 162 includes a comparison of the relative location 161 with a previous determination of the relative location 161. For example, the audio player 140 returns to the relative location estimation 160 without adjusting a location of the sound source 186 in response to determining that a difference between the relative location 161 and the previous determination of the relative location 161 is less than a location change threshold and that the location confidence level 181 is greater than a second confidence threshold.

The audio adjuster 170, during the multi-location audio generation 164, generates audio data 141B based on the audio data 141A. For example, generating the audio data 141B includes rendering the audio data 141A to have multiple locations of the sound source 186. To illustrate, the audio data 141B represents sounds of the sound source 186 from a location 150A of the sound field 142, sounds of the sound source 186 from a location 150B of the sound field 142, sounds of the sound source 186 from one or more additional locations of the sound field 142, or a combination thereof.

In a particular aspect, the audio data 141A represents sounds of the sound source 186 from the location 150A, and generating the audio data 141B includes adding the sounds of the sound source 186 from the location 150B, one or more additional locations, or a combination thereof. In an alternative aspect, the audio data 141A does not include any sounds of the sound source 186, and generating the audio data 141B includes adding the sounds of the sound source 186 from each of the multiple locations 150.

The audio player 140 performs preferred location estimation 166 based on the audio data 141B. For example, the audio player 140 initiates an audio playback operation 144A of the audio data 141B via the one or more speakers 106. For example, the audio player 140 provides the audio data 141B via the output interface 124 to the one or more speakers 106. In a particular aspect, the output interface 124 includes at least one of an ethernet interface, a universal serial bus (USB) interface, a Wi-Fi interface, a Bluetooth® (a registered trademark of Bluetooth SIG, Inc., Washington) interface, a serial port interface, a parallel port interface, or other type of data interface.

The audio data 141B includes the multiple locations 150 of the sound source 186 in the sound field 142 during the audio playback operation 144A. The audio player 140, during the audio playback operation 144A, obtains electrical activity data 105 via the input interface 114 from the one or more sensors 104. The electrical activity data 105 corresponds to electrical signals from the one or more electrical sources 184 within the head 182 of the user 180 during the audio playback operation 144A. For example, the electrical signals are generated by the one or more electrical sources 184 (e.g., brain cells) while the audio data 141B is played out to the user 180. In a particular aspect, the audio player 140, during the audio playback operation 144A, outputs an alert (e.g., a visual alert) indicating that audio configuration is being performed.

The audio player 140 determines, based on the electrical activity data 105, the user preferred location 167 of the sound source 186. For example, the audio player 140 processes the electrical activity data 105 using a preferred location model (pref. location model) 174 and an output of the preferred location model 174 (e.g., an artificial neural network, a machine learning model, or both) indicates that the location 150B corresponds to the user preferred location 167 of the sound source 186.

Figure 3:
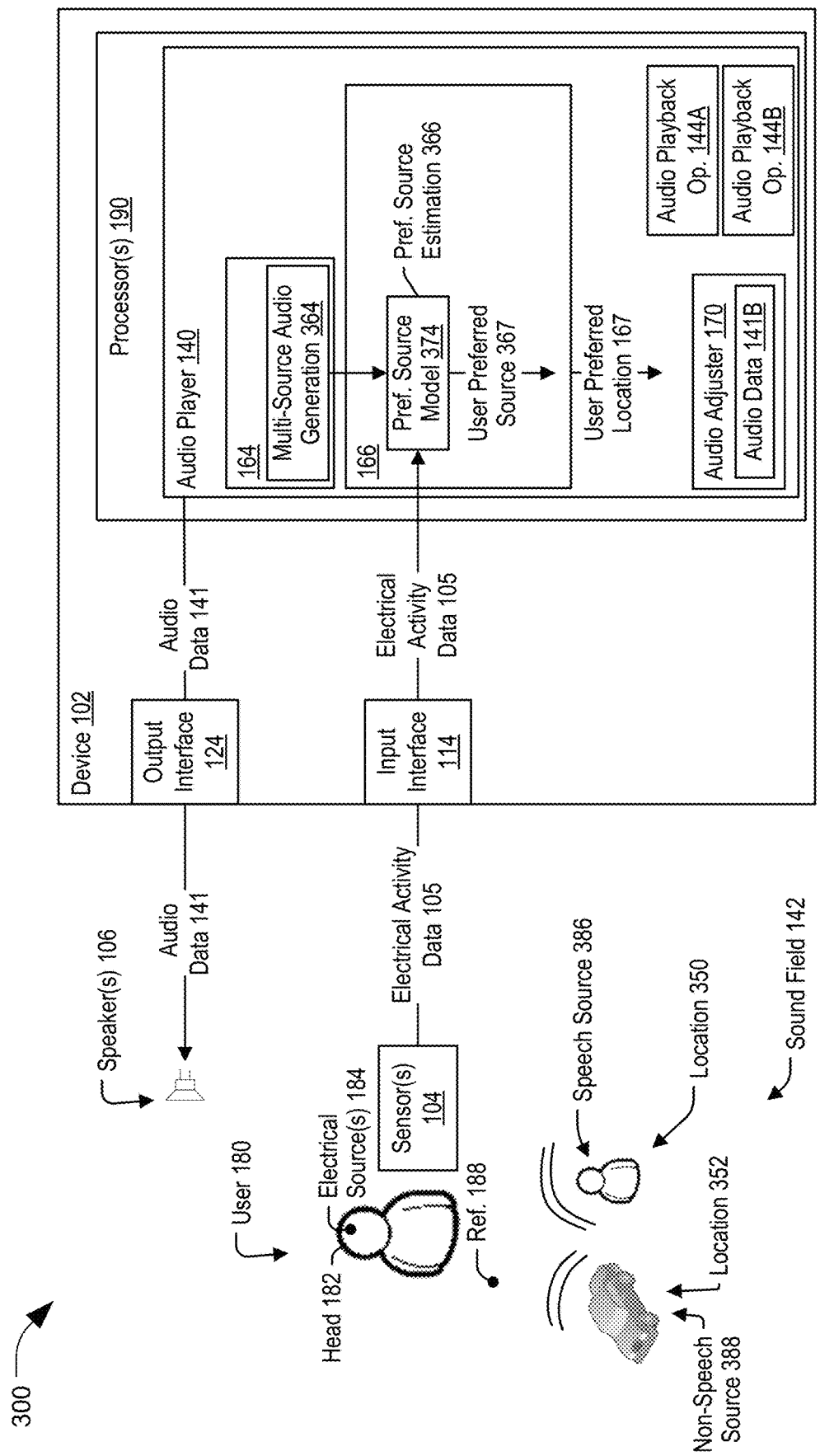
FIG. 3 is a diagram of an illustrative aspect of operation of components of the system of FIG. 1, in accordance with some examples of the present disclosure.

In some implementations, the audio player 140 determines the user preferred location 167 based on performing a preferred source estimation, as further described with respect to FIG. 3. For example, the audio adjuster 170 generates the audio data 141B by rendering the audio data 141A to have a first location of a speech source and a second location of a non-speech source (e.g., a car) during the audio playback operation 144A. The audio adjuster 170 determines the user preferred location 167 based on the electrical activity data 105 obtained during the audio playback operation 144A. For example, the audio player 140 determines that the first location of the speech source corresponds to the user preferred location 167 in response to determining that the electrical activity data 105 indicates that a single source is being tracked by the user 180. Alternatively, the audio player 140 determines that the second location of the non-speech source corresponds to the user preferred location 167 in response to determining that the electrical activity data 105 indicates that multiple sources are being tracked by the user 180. For example, the human brain tracks speech even when the user 180 is listening to non-speech sounds (e.g., a car driving by) so the electrical activity data 105 indicating that multiple sources are being tracked by the user 180 corresponds to the user 180 listening to the non-speech sounds (e.g., the car).

The audio player 140 performs the single location audio generation 168 based on the user preferred location 167. For example, the audio adjuster 170 generates the audio data 141C based on the user preferred location 167 and the audio data 141A. To illustrate, generating the audio data 141C includes rendering the audio data 141A to have the user preferred location 167 (e.g., the location 150B) of the sound source 186 in the sound field 142. As an example, the audio player 140 adjusts the location of the sound source 186 from the location 150A in the sound field 142 (as represented in the audio data 141A) to the location 150B in the sound field 142 (as represented in the audio data 141C).

The audio player 140 initiates an audio playback operation 144B of the audio data 141C via the one or more speakers 106. For example, the audio player 140 provides the audio data 141C via the output interface 124 to the one or more speakers 106. The audio data 141C includes the user preferred location 167 (e.g., the location 150B) of the sound source 186 in the sound field 142 during the audio playback operation 144B. For example, the location of the sound source 186 is adjusted to the user preferred location 167 (e.g., the location 150B) during the audio playback operation 144B. To illustrate, the sound source 186 is perceived as coming from a single location of the sound field 142 during the audio playback operation 144B. In a particular aspect, the single location of the sound source 186 is fixed at the user preferred location 167 (e.g., the location 150B) during the audio playback operation 144B. In an alternative aspect, the single location of the sound source 186 is initialized at the user preferred location 167 (e.g., the location 150B) and changes during the audio playback operation 144B. For example, the sound source 186 corresponds to a flying bird and the location of the sound from the bird moves in the sound field 142.

The system 100 thus enables rendering audio with sounds that can be perceived as coming from a direction of the sound source 186 that is mapped to the user preferred location 167 or an estimate of the user preferred location 167 (e.g., the relative location 161). As an example, if the user 180 puts the playback device (e.g., the reference 188) on a desk, the location of the sound source 186 can be adjusted to continue to be perceived as coming from in front of the user 180 (e.g., the user preferred location 167).

Figure 2A:
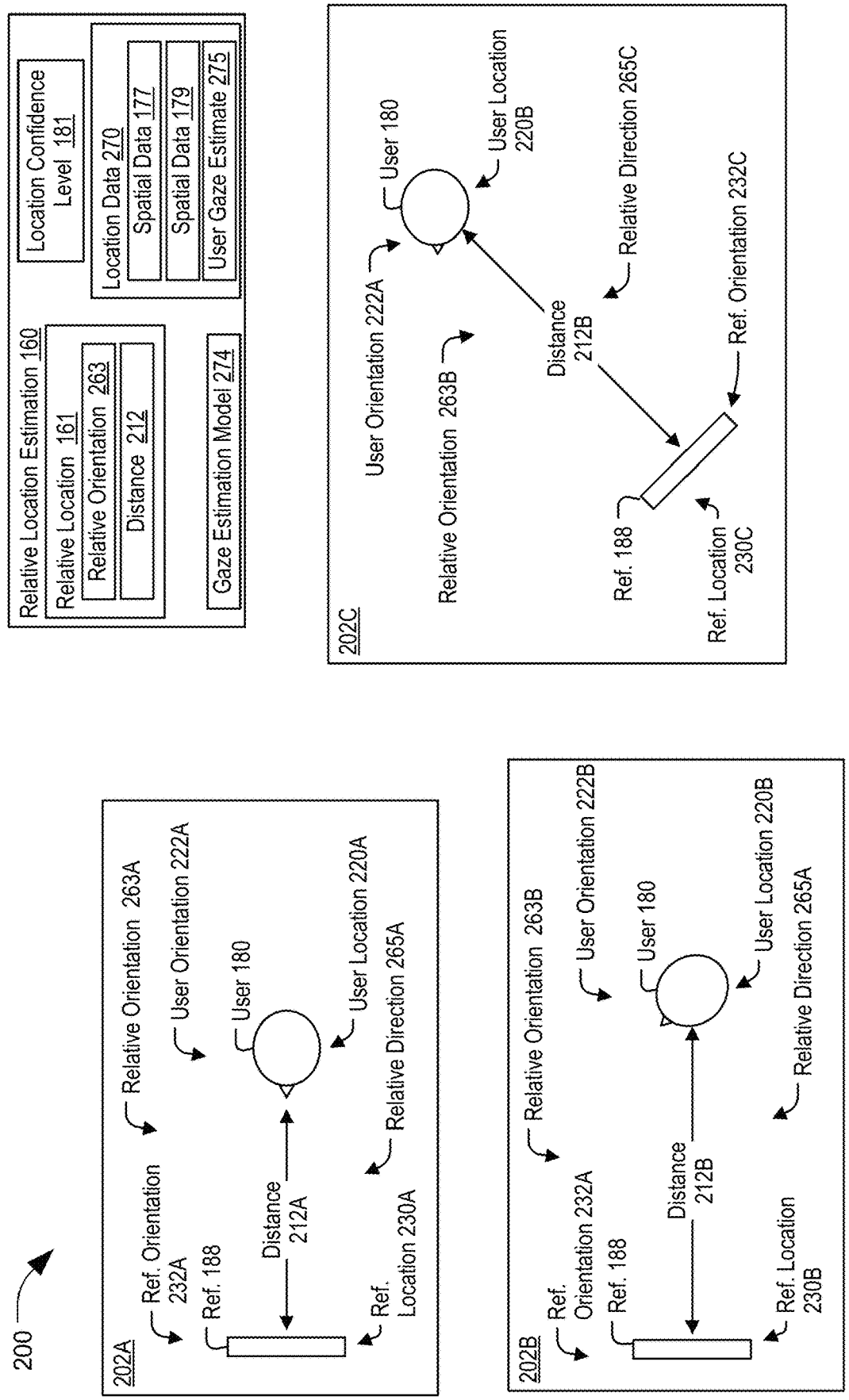
FIGS. 2A and 2B are diagrams of illustrative aspects of operations associated with relative location estimation that may be performed by the system of FIG. 1, in accordance with some examples of the present disclosure.

Referring to FIG. 2A, a diagram 200 of illustrative aspects of operations associated with the relative location estimation 160 is shown. The relative location estimation 160 may be performed by the audio player 140 of FIG. 1.

The audio player 140 performs the relative location estimation 160 to determine the relative location 161. The relative location 161 includes a distance 212, a relative orientation 263, or both, of the user 180 relative to the reference 188. For example, the distance 212 indicates a distance between a user location 220 (e.g., an estimated location of the user 180) and a reference location 230 (e.g., an estimated location of the reference 188). The relative orientation 263 indicates a user orientation 222 (e.g., an estimated orientation of the user 180) relative to a reference orientation 232 (e.g., an estimated orientation of the reference 188).

The audio player 140 performs the relative location estimation 160 based on location data 270. For example, the audio player 140 initializes the relative location 161 to correspond to the reference 188 (e.g., a mobile phone screen) oriented in front of (e.g., facing) the user 180 at a predetermined distance (e.g., 12 inches) from the user 180. The audio player 140 updates the relative location 161 based on updates to the location data 270.

Examples 202A-202C illustrate a top-down view of a horizontal plane in a three-dimensional space. In a particular aspect, the horizontal plane is defined by an X-axis and a Y-axis in the three-dimensional space, and a vertical plane is defined by the X-axis and a Z-axis in the three-dimensional space. Example 202A corresponds to the audio player 140 initializing the relative orientation 263 and the distance 212 to a relative orientation 263A and a distance 212A, respectively. Examples 202B-202C correspond to the audio player 140 updating the relative orientation 263 and the distance 212 based on updates to the location data 270.

In Example 202A, the audio player 140 initializes the reference location 230 of the reference 188 to a reference location 230A, the reference orientation 232 of the reference 188 to a reference orientation 232A, the user location 220 of the user 180 to a user location 220A, and the user orientation 222 of the user 180 to a user orientation 222A.

In some implementations, the spatial data 179 (e.g., GPS data, configuration data, image data, etc.) indicates that the reference 188 is detected at the reference location 230A having the reference orientation 232A in the three-dimensional space, and the audio player 140 initializes the reference location 230 and the reference orientation 232 to the reference location 230A and the reference orientation 232A, respectively. In alternative implementations, the audio player 140 initializes the reference location 230 to the reference location 230A corresponding to an origin point (e.g., 0 inches along an X axis, 0 inches along a Y axis, and 0 inches along a Z axis) of the three-dimensional space, and the reference orientation 232A corresponds to the reference 188 facing a predetermined direction (e.g., 0 degrees in the horizontal plane and 0 degrees in the vertical plane) in the three-dimensional space.

In some implementations, the spatial data 177 (e.g., GPS data, image data, etc.) indicates that the user 180 is detected at the user location 220A having the user orientation 222A in the three-dimensional space, and the audio player 140 initializes the user location 220 and the user orientation 222 to the user location 220A and the user orientation 222A, respectively. In alternative implementations, the audio player 140 initializes the user location 220 to the user location 220A corresponding to a predetermined point (e.g., at a predetermined distance and a predetermined direction) from the reference location 230A in the three-dimensional space. For example, the user location 220A corresponds to a point (e.g., 12 inches along the X axis, 0 inches along the Y axis, and 0 inches along the Z axis) that is a distance 212A (e.g., the predetermined distance, such as 12 inches) at a relative direction 265A (e.g., 0 degrees in the horizontal plane and 0 degrees in the vertical plane) from the origin point in the three-dimensional space. The audio player 140 initializes the user orientation 222A to a predetermined direction (e.g., 180 degrees in the horizontal plane (e.g., XY plane) and 0 degrees in the vertical plane (e.g., XZ plane)) in the three-dimensional space to correspond to the user 180 facing the reference 188. The audio player 140 thus initializes, at a time T0, the distance 212 to the distance 212A and the relative orientation 263 to a relative orientation 263A. The relative orientation 263A (e.g., 0 degrees in the horizontal plane and 0 degrees in the vertical plane) is based on the reference orientation 232A (e.g., 0 degrees in the hori-zontal plane and 0 degrees in the vertical plane), the user orientation 222A (e.g., 180 degrees in the horizontal plane and 0 degrees in the vertical plane), and the relative direction 265A (e.g., 0 degrees in the horizontal plane and 0 degrees in the vertical plane) of the user location 220A to the reference location 230A.

The audio player 140 updates the relative location 161 based on the location data 270. For example, the location data 270 indicates a change in a location of the user 180, a change in an orientation of the user 180, a change in a location of the reference 188, a change in an orientation of the reference 188, or a combination thereof, and the audio player 140 updates the relative location 161 based on the changes indicated by the location data 270. In a particular aspect, the location data 270 includes spatial data 177 of the user 180, spatial data 179 of the reference 188, a user gaze estimate 275, or a combination thereof.

The electrical activity data 105 can indicate a direction of a user gaze (e.g., the user gaze estimate 275). In a particular aspect, the direction of the user gaze is relative to the orientation of the head 182. For example, if the user 180 is looking at a particular gaze target and continues to look at the same gaze target while changing the orientation of the head 182 by a particular amount (e.g., 10 degrees), the direction of the user gaze changes by the particular amount (e.g., 10 degrees). In a particular aspect, the audio player 140 estimates a change in orientation of the user 180 based on the user gaze estimate 275. For example, the audio player 140 determines a change in orientation of the head 182 of the user 180 based on the spatial data 177. In some implementations, the change in orientation of the head 182 corresponds to a broad estimate of the change in the user orientation 222, and the audio player 140 refines the estimate of the change in the user orientation 222 based on the user gaze estimate 275. For example, if the user 180 moves the head 182 but keeps the gaze towards the same location, there may be no change in the user orientation 222.

In a particular aspect, the audio player 140 uses a gaze estimation model 274 (e.g., an artificial neural network, a machine learning model, or both) to process the electrical activity data 105 (e.g., EOG data) to determine the user gaze estimate 275. Determining the user orientation 222 (e.g., head orientation) based on the spatial data 177 and updating the user orientation 222 based on the user gaze estimate 275 (e.g., user gaze direction) is provided as an illustrative non-limiting example. In some examples, the audio player 140 can process the spatial data 177 and the electrical activity data 105 (indicating the direction of the user gaze) to determine the user orientation 222.

According to some studies, EOG data (e.g., the electrical activity data 105) is modeled to detect saccades (e.g., rapid movement of eyes between fixation states), and the variation of an EOG signal indicating a saccade reflects the direction of a gaze shift. For example, an increase in the variation of the EOG signal indicates a gaze shift to the right and a decrease indicates a gaze shift to the left. An amplitude of the EOG signal indicates the angle of the gaze shift. For example, a higher absolute value of the amplitude indicates a larger gaze shift. In a particular aspect, the user gaze estimate 275 is determined in response to detecting a fixation. For example, a fixation is detected based on determining that the direction of the user gaze is unchanged for at least a threshold duration.

In some implementations, the spatial data 177 (e.g., GPS data, image data, or both) can directly indicate the user location 220, the user orientation 222, or both, instead of the audio player 140 estimating the user location 220, the user orientation 222, or both, based on changes. In some implementations, the spatial data 179 (e.g., GPS data, image data, or both) can directly indicate the reference location 230, the reference orientation 232, or both, instead of the audio player 140 estimating the reference location 230, the reference orientation 232, or both, based on changes.

In some implementations, the reference 188 has a fixed location (e.g., the reference location 230A). In some aspects, the spatial data 179 indicates changes (if any) in the reference orientation 232, the fixed location (e.g., the reference location 230A), or both. In alternative aspects, the reference 188 has a fixed orientation (e.g., the reference orientation 232A). In some examples, the spatial data 179 indicates the fixed location (e.g., the reference location 230A), the fixed orientation (e.g., the reference orientation 232A), or both. In some examples, the spatial data 179 indicates no changes to the reference location 230, no changes to the reference orientation 232, or both. In yet other examples, the location data 270 may not include the spatial data 179. For example, the audio player 140 estimates (e.g., updates) the user location 220 and the user orientation 222 based on the spatial data 177, the user gaze estimate 275, or both, and performs the relative location estimation 160 based on the fixed location and the fixed orientation of the reference 188 and the estimated location and the estimated orientation of the user 180.

Examples 202B and 202C illustrate examples of the same relative orientation 263 corresponding to different user orientation 222, different reference orientation 232, and different reference location 230. In some examples, the same relative orientation 263 can correspond to different user orientation 222, different reference orientation 232, different user location 220, different reference location 230, or a combination thereof. In Example 202B, the audio player 140 obtains the location data 270 at a time T1 that is subsequent to the time T0. The audio player 140 determines, based on the spatial data 177, that the user 180 has a user orientation 222B (e.g., 135 degrees in the horizontal plane and 0 degrees in the vertical plane) and is at a user location 220B. The audio player 140 determines, based on the spatial data 179, that the reference 188 is at a reference location 230B and has the reference orientation 232A (e.g., 0 degrees in the horizontal plane and 0 degrees in the vertical plane). The audio player 140 determines a distance 212B based on a difference between the user location 220B and the reference location 230B.

The audio player 140 determines that the user location 220B (e.g., a first point in a 3D space) has the relative direction 265A (e.g., 0 degrees in the horizontal plane and 0 degrees in the vertical plane) from the reference location 230B (e.g., a second point in the 3D space). For example, the relative direction 265 is the same in the Example 202B as in the Example 202A.

The relative direction 265 (e.g., a direction of the first point relative to the second point in the 3D space) is based on a direction of the user location 220 (e.g., the first point) relative to the reference location 230 (e.g., the second point), and is independent of the user orientation 222 and the reference orientation 232. In comparison, the relative orientation 263 is based on the user orientation 222 and the reference orientation 232 in addition to the relative direction 265 of the user location 220 to the reference location 230. For example, the relative orientation 263 indicates an orientation of at least a first plane (e.g., including the first point) corresponding to the user 180 relative to at least a second plane (e.g., including the second point) corresponding to the reference 188. In an illustrative non-limiting example, the first plane corresponds to a vertical cross-section of the head 182 of the user 180 and the second plane corresponds to a display screen of the reference 188 (e.g., a mobile device).

The audio player 140 determines the relative orientation 263B (e.g., 45 degrees in the horizontal plane and 0 degrees in the vertical plane) based on the user orientation 222B (e.g., 135 degrees in the horizontal plane and 0 degrees in the vertical plane), the reference orientation 232A (e.g., 0 degrees in the horizontal plane and 0 degrees in the vertical plane), and the relative direction 265B (e.g., 0 degrees in the horizontal plane and 0 degrees in the vertical plane) of the user location 220B to the reference location 230B. In some examples, the relative orientation 263 can be different for a different relative direction 265 with the same user orientation 222 and the same reference orientation 232, as further described with reference to FIG. 2B.

In Example 202C, the audio player 140 obtains the location data 270 at a time T2 that is subsequent to the time T0. The audio player 140 determines, based on the spatial data 177, that the user 180 has the user orientation 222A (e.g., 180 degrees in the horizontal plane and 0 degrees in the vertical plane) and is at the user location 220B. The audio player 140 determines, based on the spatial data 179, that the reference 188 is at a reference location 230C and has a reference orientation 232C (e.g., 45 degrees in the horizontal plane and 0 degrees in the vertical plane). The audio player 140 determines the distance 212B based on a difference between the user location 220B and the reference location 230C.

The audio player 140 determines the relative direction 265C based on a comparison of the user location 220B (e.g., the first point in the 3D space) and the reference location 230C (e.g., a third point in the 3D space). For example, the user location 220B has the relative direction 265C (e.g., 45 degrees in the horizontal plane and 0 degrees in the vertical plane) from the reference location 230C. The audio player 140 determines the relative orientation 263B (e.g., 45 degrees in the horizontal plane and 0 degrees in the vertical plane) based on the user orientation 222A (e.g., 180 degrees in the horizontal plane and 0 degrees in the vertical plane), the reference orientation 232C (e.g., 45 degrees in the horizontal plane and 0 degrees in the vertical plane), and the relative direction 265C (e.g., 45 degrees in the horizontal plane and 0 degrees in the vertical plane) of the user location 220B to the reference location 230C. The relative orientation 263 is the same (e.g., the relative orientation 263B) in the Example 202C as in the Example 202B for different reference location 230, different reference orientation 232, different user orientation 222, different relative direction 265, same distance 212, and same user location 220. For example, at least the first plane (e.g., a vertical cross-section of the head 182) corresponding to the user 180 has the same orientation relative to at least the second plane (e.g., the display screen) corresponding to the reference 188 in the Example 202C as compared to the Example 202B.

Figure 2B:
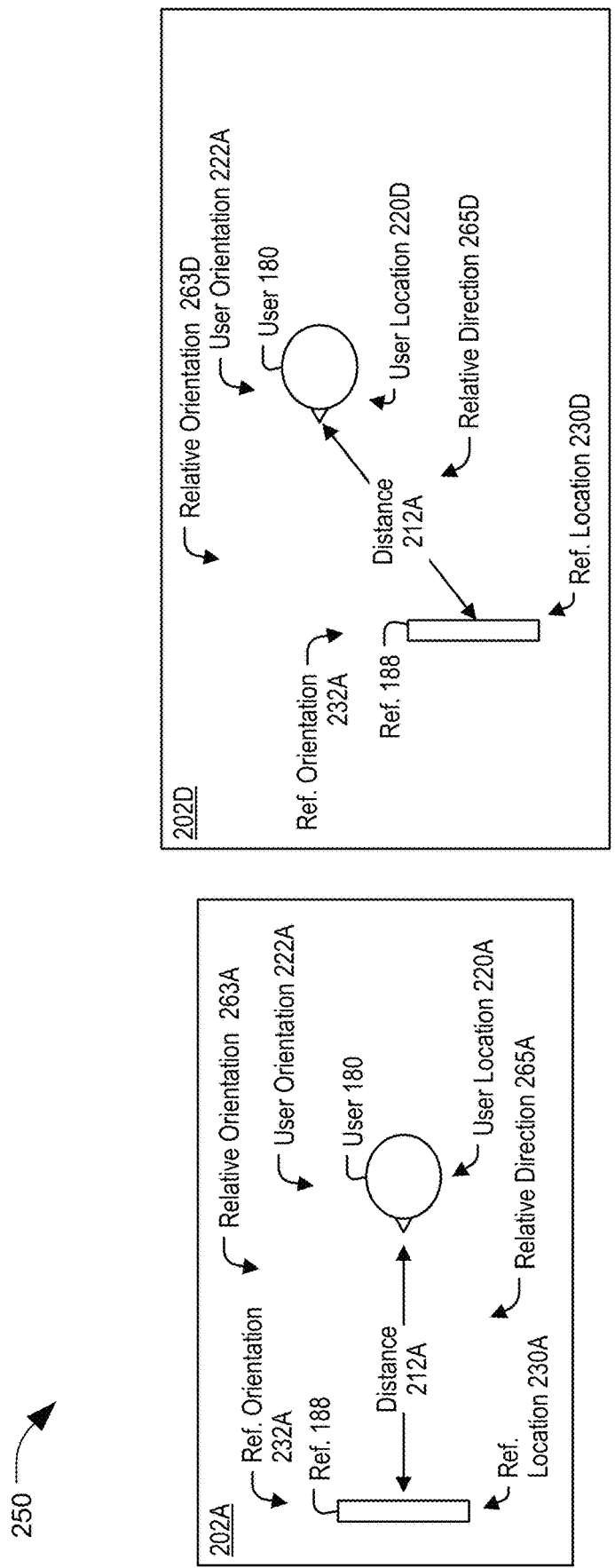

Referring to FIG. 2B, a diagram 250 of an illustrative aspect of operations associated with the relative location estimation 160 is shown. The relative location estimation 160 may be performed by the audio player 140 of FIG. 1. Example 202D illustrate examples of the same user orientation 222 and the same reference orientation 232 corresponding to a different relative orientation 263 because of a different relative direction 265 of the user location 220 to the reference point location 230.

Example 202D corresponds to the audio player 140 updating the relative orientation 263 and the distance 212 based on updates to the location data 270. In Example 202D, the audio player 140 obtains the location data 270 at a time T3 that is subsequent to the time T0. The audio player 140 determines, based on the spatial data 177, that the user 180 has the user orientation 222A (e.g., 180 degrees in the horizontal plane and 0 degrees in the vertical plane) and is at a user location 220D. The audio player 140 determines, based on the spatial data 179, that the reference 188 has the reference orientation 232A (e.g., 0 degrees in the horizontal plane and 0 degrees in the vertical plane) and is at a reference location 230D. The audio player 140 determines the distance 212A based on a difference between the user location 220D and the reference location 230D.

The audio player 140 determines the relative direction 265D based on a comparison of the user location 220D (e.g., a third point in the 3D space) and the reference location 230D (e.g., a fourth point in the 3D space). For example, the user location 220D has the relative direction 265D (e.g., 39 degrees in the horizontal plane and 0 degrees in the vertical plane) from the reference location 230D. The audio player 140 determines a relative orientation 263D (e.g., 39 degrees in the horizontal plane and 0 degrees in the vertical plane) based on the user orientation 222A (e.g., 180 degrees in the horizontal plane and 0 degrees in the vertical plane), the reference orientation 232A (e.g., 0 degrees in the horizontal plane and 0 degrees in the vertical plane), and the relative direction 265D (e.g., 39 degrees in the horizontal plane and 0 degrees in the vertical plane) of the user location 220D to the reference point location 230D.

The relative orientation 263D of the Example 202D is different from the relative orientation 263A of the Example 202A for the same user orientation 222 (e.g., the user orientation 222A), the same reference orientation 232 (e.g., the reference orientation 232A), a different relative direction 265, a different user location 220, and a different reference location 230. For example, the first plane (e.g., a vertical cross-section of the head 182) corresponding to the user 180 has the same user orientation 222 and the second plane (e.g., the display screen) corresponding to the reference 188 has the same reference orientation 232 in the Example 202D as compared to the Example 202A. The first plane has a different relative orientation 263 to the second plane in the Example 202D as compared to the Example 202A because the relative direction 265D of the third point relative to the fourth point is different from the relative direction 265A of the first point relative to the second point.

Referring to FIG. 3, a diagram of a system operable to adjust audio based on user electrical signals is shown and generally designated 300. In a particular aspect, the system 100 of FIG. 1 includes one or more components of the system 300.

In FIG. 3, examples of implementations of the multi-location audio generation 164 and the preferred location estimation 166 are illustrated. For example, the multi-location audio generation 164 includes multi-source audio generation 364. To illustrate, the audio player 140 generates the audio data 141B by rendering the audio data 141A to have a location 350 of a speech source 386 and a location 352 of a non-speech source 388 in the sound field 142.

The audio player 140 initiates an audio playback operation 144A of the audio data 141B via the one or more speakers 106. The one or more sensors 104 generate the electrical activity data 105 during the audio playback operation 144A. For example, the electrical activity data 105 is based on the electrical signals from the one or more electrical sources 184 during the audio playback operation 144A.

In some examples, the preferred location estimation 166 includes preferred source estimation (pref. source estimation) 366. For example, the audio player 140 identifies, based on the electrical activity data 105, one of the speech source 386 or the non-speech source 388 as a user preferred source 367. The audio player 140 processes the electrical activity data 105 using a preferred source model 374 (e.g., an artificial neural network, a machine learning model, or both) to generate a count of tracked sound sources.

A "tracked sound source" corresponds to a sound source that an auditory system of the user 180 focuses on (e.g., attends) as the sound source moves in the sound field 142 during the audio playback operation 144A. According to some studies, linear mappings (e.g., temporal response functions (TRFs)) can be derived between EEG data and attended as well as unattended sound source trajectories. Trajectory (e.g., a pathway) of an attended sound source can be reliably reconstructed from both delta phase and alpha power of EEG even in the presence of distracting stimuli. Tracking of an unattended non-speech sound source (e.g., noise) is below detection level, and unattended speech is weakly tracked (e.g., by the delta phase of the EEG).

If the user 180 attends the speech source 386 during the audio playback operation 144A, the electrical activity data 105 (e.g., the delta phase and the alpha power of EEG data) tracks the speech source 386, whereas tracking of the non-speech source 388 is below detection level. If the user 180 attends the non-speech source 388 during the audio playback operation 144A, the electrical activity data 105 tracks the non-speech source 388 and weakly tracks the speech source 386. For example, the delta phase and the alpha power of the EEG tracks the non-speech source 388, and the delta phase of the EEG weakly tracks the speech source 386.

In some implementations, the preferred source model 374 is trained to determine a count of tracked sound sources indicated by electrical activity data. For example, training electrical activity data is generated by using the one or more speakers 106 to play back audio corresponding to sound sources (e.g., one or more speech sources, one or more non-speech sources, or a combination thereof) that move (e.g., change locations) in a sound field, requesting the user 180 to focus on (e.g., attend) particular sound sources during playback, collecting the training electrical activity data from the one or more sensors 104, and tagging the training electrical activity data with a count of the attended sound sources. The preferred source model 374 is used to process the training electrical activity data to generate an estimated count of tracked sound sources, a loss metric is based on a comparison of the estimated count and the tagged count, and configuration settings (e.g., weights, biases, or a combination thereof) of the preferred source model 374 are adjusted based on the loss metric.

The audio player 140, in response to determining that the count of tracked sound sources has a first value (e.g., 1) indicating that a single sound source is tracked, determines that the speech source 386 corresponds to a user preferred source 367 and that the location 350 corresponds to the user preferred location 167. Alternatively, the audio player 140, in response to determining that the count of tracked sound sources has a second value (e.g., greater than 1) indicating that multiple sound sources (e.g., the speech source 386 and the non-speech source 388) were tracked by the user 180, determines that the non-speech source 388 corresponds to the user preferred source 367 and that the location 352 corresponds to the user preferred location 167. To illustrate, human brain tracks speech to some extent even when a listener (e.g., the user 180) is paying attention to non-speech audio and does not track non-speech when the listener is paying attention to speech audio. The audio player 140 performs the single location audio generation 168 based on the user preferred location 167 (e.g., one of the location 350 or the location 352), as described with reference to FIG. 1.

Figure 4:
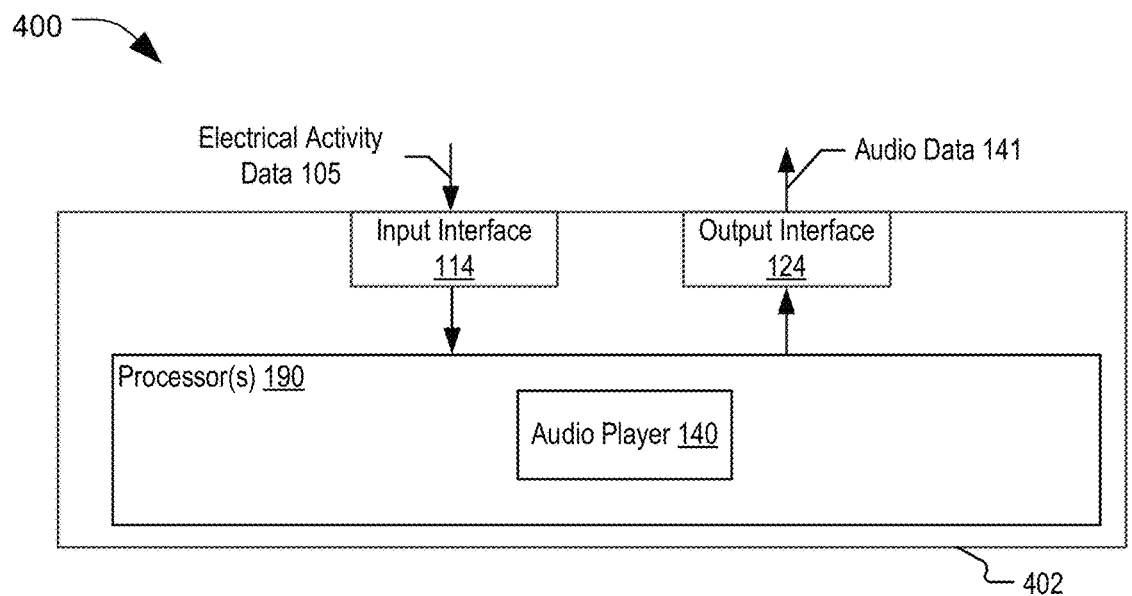
FIG. 4 illustrates an example of an integrated circuit operable to adjust audio based on user electrical signals, in accordance with some examples of the present disclosure.
Figure 6:
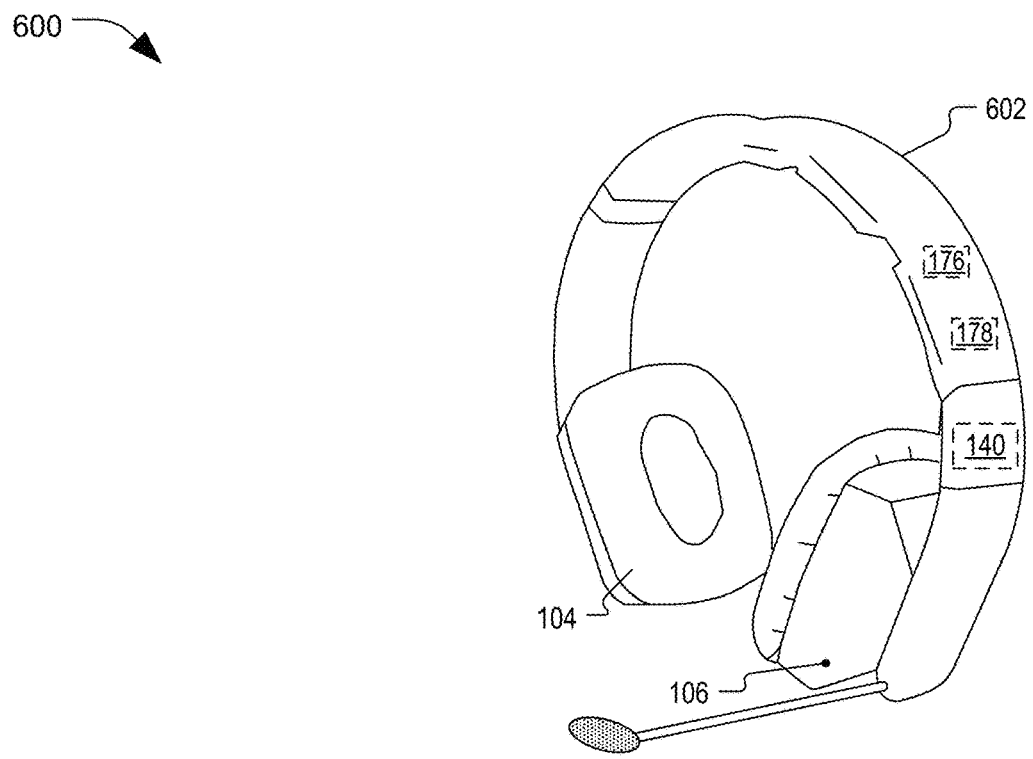
FIG. 6 is a diagram of a headset operable to adjust audio based on user electrical signals, in accordance with some examples of the present disclosure.
Figure 7:
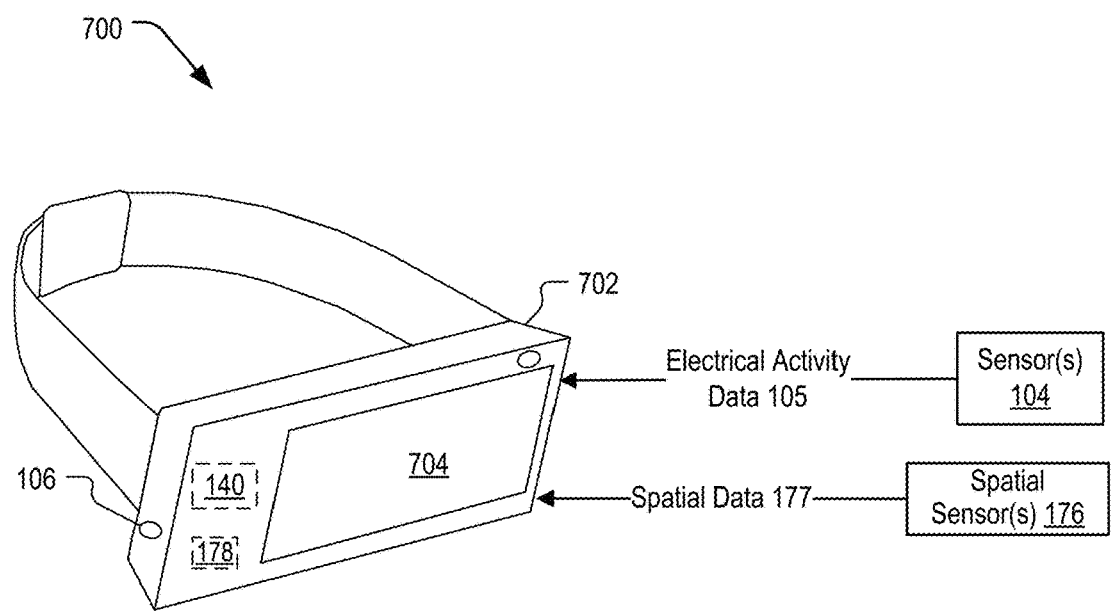
FIG. 7 is a diagram of a wearable electronic device operable to adjust audio based on user electrical signals, in accordance with some examples of the present disclosure.
Figure 8:
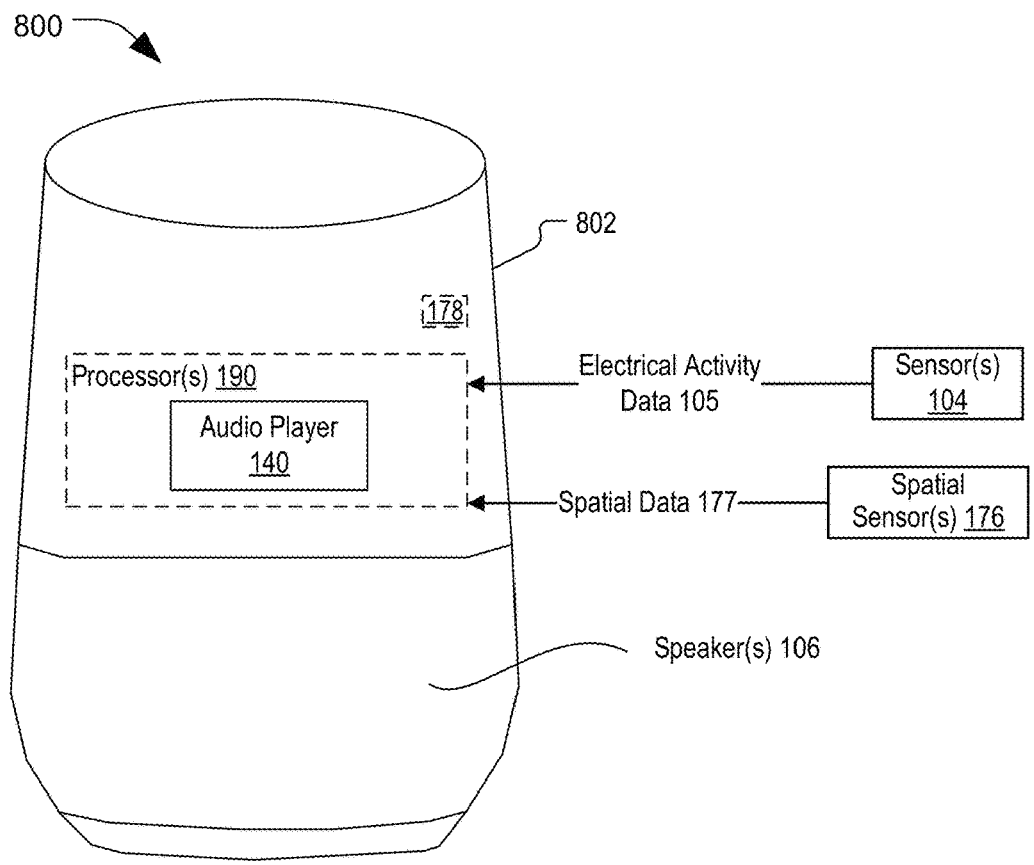
FIG. 8 is a diagram of a voice-controlled speaker system operable to adjust audio based on user electrical signals, in accordance with some examples of the present disclosure.
Figure 9:
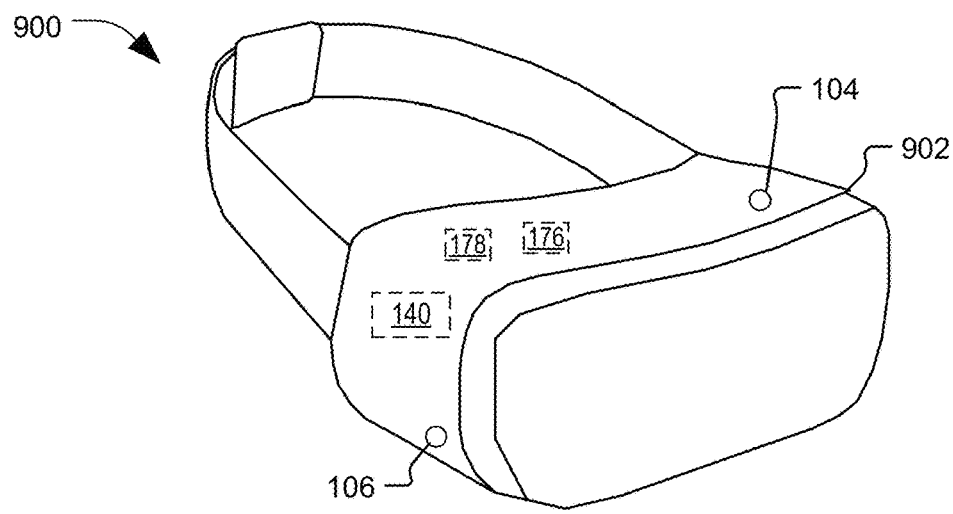
FIG. 9 is a diagram of a headset, such as a virtual reality, mixed reality, or augmented reality headset, operable to adjust audio based on user electrical signals, in accordance with some examples of the present disclosure.
Figure 10:
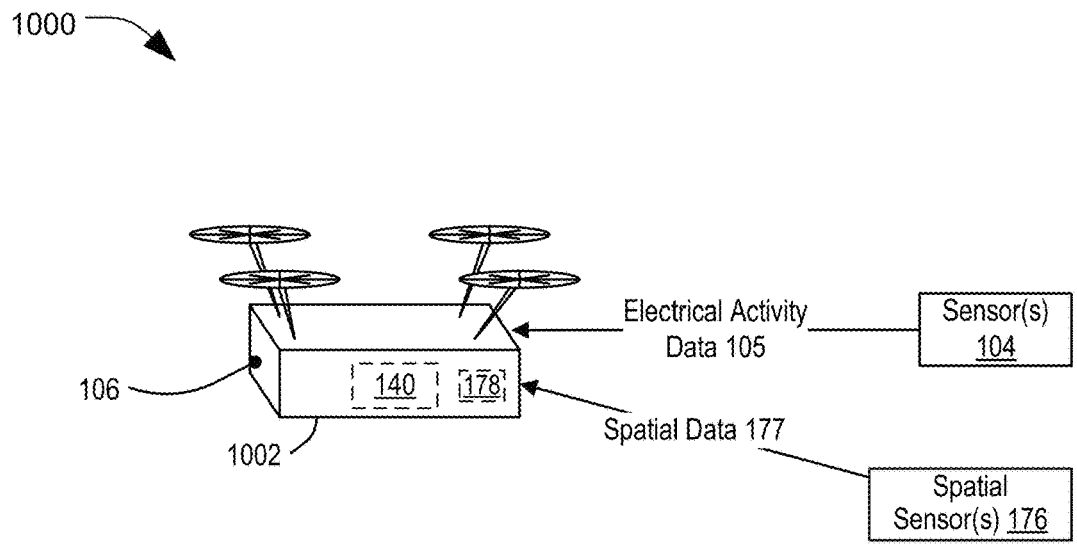
FIG. 10 is a diagram of a vehicle operable to adjust audio based on user electrical signals, in accordance with some examples of the present disclosure.
Figure 11:
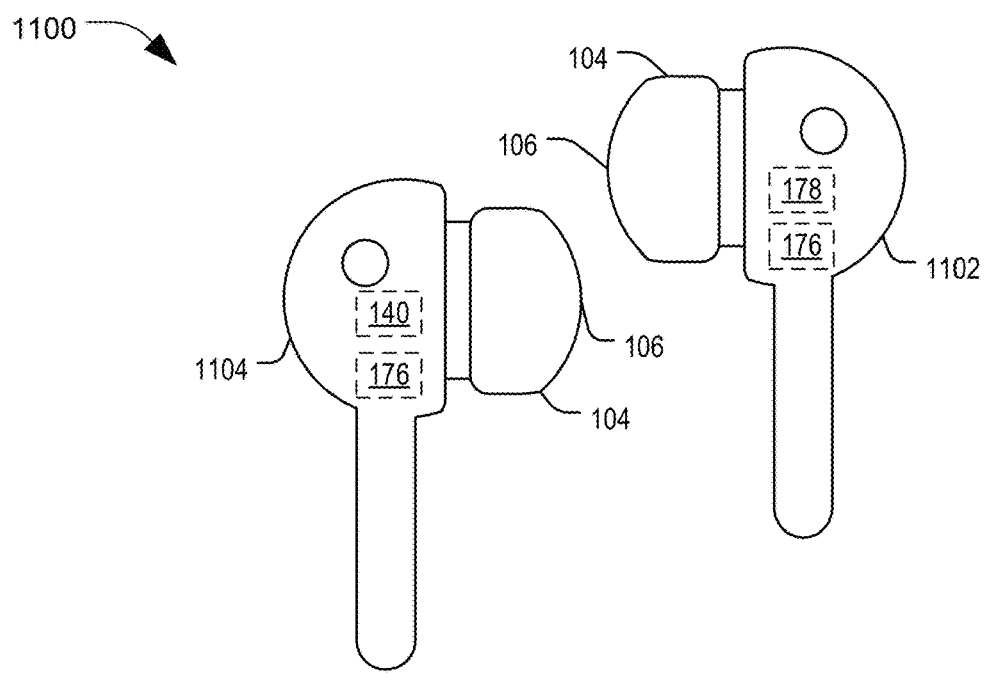
FIG. 11 is a diagram of earbuds operable to adjust audio based on user electrical signals, in accordance with some examples of the present disclosure.

FIG. 4 depicts an implementation 400 of the device 102 as an integrated circuit 402 that includes the one or more processors 190. The integrated circuit 402 also includes the input interface 114, such as one or more bus interfaces, to enable the electrical activity data 105 to be received for processing. The integrated circuit 402 also includes the output interface 124, such as a bus interface, to enable sending of the audio data 141. The integrated circuit 402 enables adjusting audio based on user electrical signals. In some examples, the integrated circuit 402 corresponds to a component in a system that is coupled to the one or more sensors 104, the one or more speakers 106, or a combination thereof, such as a mobile phone or tablet as depicted in FIG. 5, a headset as depicted in FIG. 6, a wearable electronic device as depicted in FIG. 7, a voice-controlled speaker system as depicted in FIG. 8, a virtual reality, mixed reality, or augmented reality headset as depicted in FIG. 9, a vehicle as depicted in FIG. 10, or one or more earbuds as depicted in FIG. 11.

Figure 5:
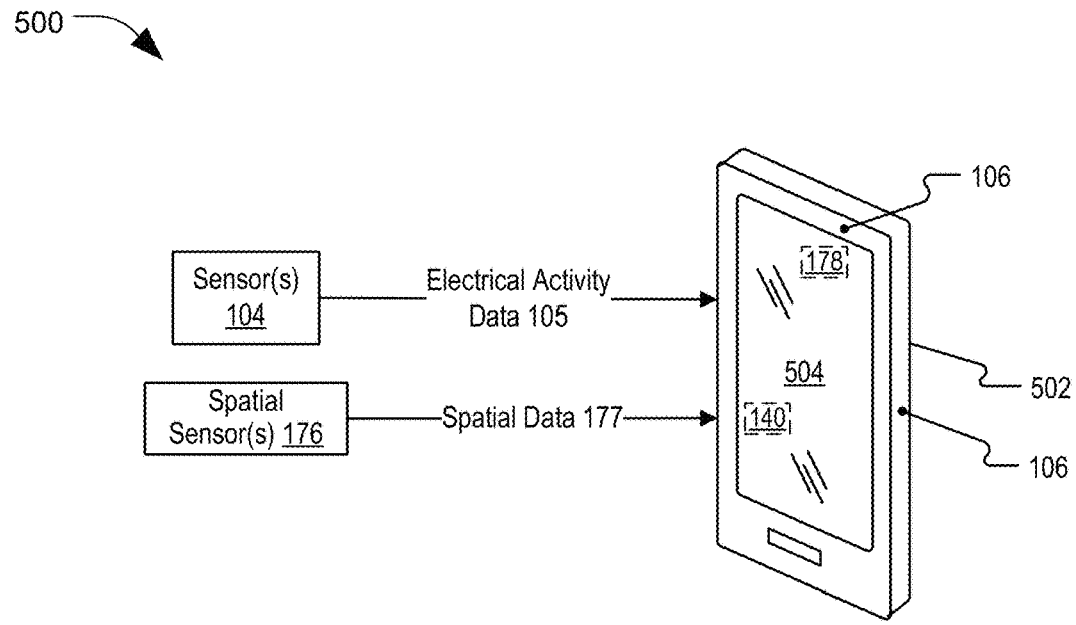
FIG. 5 is a diagram of a mobile device operable to adjust audio based on user electrical signals, in accordance with some examples of the present disclosure.

FIG. 5 depicts an implementation 500 in which the device 102 includes a mobile device 502, such as a phone or tablet, as illustrative, non-limiting examples. The mobile device 502 includes the one or more speakers 106, a display screen 504, or a combination thereof. Components of the one or more processors 190, including the audio player 140, are integrated in the mobile device 502 and are illustrated using dashed lines to indicate internal components that are not generally visible to a user of the mobile device 502.

The mobile device 502 is coupled to the one or more sensors 104. In some implementations, the mobile device 502 corresponds to the reference 188 and includes the one or more motion sensors 178. The one or more motion sensors 178 are illustrated using dashed lines to indicate internal components that are not generally visible to a user of the mobile device 502. In some implementations, the one or more sensors 104, the one or more speakers 106, the one or more spatial sensors 176, or a combination thereof, are integrated in a user head-mounted device (e.g., a headset or earbuds) and the audio player 140 is integrated in the mobile device 502. In some implementations, the one or more spatial sensors 176 (e.g., a camera) is integrated in the mobile device 502.

In a particular example, the audio player 140 operates to adjust audio based on user electrical signals, which can also be processed to perform one or more operations at the mobile device 502, such as to launch a graphical user interface or otherwise display information associated with adjusting the audio or information associated with detected speech in the audio at the display screen 504 (e.g., via an integrated "smart assistant" application).

FIG. 6 depicts an implementation 600 in which the device 102 includes a headset device 602. The headset device 602 includes, or is coupled to, the one or more sensors 104, the one or more speakers 106, the one or more spatial sensors 176, the one or more spatial sensors 178, or a combination thereof. Components of the one or more processors 190, including the audio player 140, are integrated in the headset device 602. In a particular example, the audio player 140 operates to adjust audio based on user electrical signals, which may cause the headset device 602 to perform one or more operations at the headset device 602, to transmit the adjusted audio data to a second device (not shown), for further processing, or a combination thereof.

In some implementations, the headset device 602 includes the one or more sensors 104, the one or more speakers 106, the one or more spatial sensors 176, or a combination thereof, and is coupled to a second device that includes the audio player 140. The one or more spatial sensors 178 can be included in the headset device 602, the second device, or both. In some aspects, the second device includes a vehicle, a mobile device, a phone, a gaming console, a communication device, a wearable electronic device, a voice-controlled speaker system, an unmanned vehicle, or a combination thereof.

FIG. 7 depicts an implementation 700 in which the device 102 includes a wearable electronic device 702, illustrated as a "smart watch." The audio player 140 and the one or more speakers 106 are integrated into, or coupled to, the wearable electronic device 702.

The wearable electronic device 702 is coupled to the one or more sensors 104. In some implementations, the wearable electronic device 702 corresponds to the reference 188 and includes the one or more motion sensors 178. The one or more motion sensors 178 are illustrated using dashed lines to indicate internal components that are not generally visible to a user of the wearable electronic device 702. In some implementations, the one or more sensors 104, the one or more speakers 106, the one or more spatial sensors 176, or a combination thereof, are integrated in a user head-mounted device (e.g., a headset or earbuds) and the audio player 140 is integrated in the wearable electronic device 702. In some implementations, the one or more spatial sensors 176 (e.g., a camera) is integrated in the wearable electronic device 702.

In a particular example, the audio player 140 operates to adjust audio based on user electrical signals, which is then processed to perform one or more operations at the wearable electronic device 702, such as to launch a graphical user interface or otherwise display information associated with adjusting the audio or information associated with detected speech in the audio at a display screen 704 of the wearable electronic device 702. To illustrate, the wearable electronic device 702 may include a display screen that is configured to display a notification during the audio playback operation 144A by the wearable electronic device 702. In a particular example, the wearable electronic device 702 includes a haptic device that provides a haptic notification (e.g., vibrates) during the audio playback operation 144A. For example, the haptic notification can cause a user to look at the wearable electronic device 702 to see a displayed notification indicating audio configuration in progress. The wearable electronic device 702 can thus alert a user with a hearing impairment or a user wearing a headset that audio configuration is being performed.

FIG. 8 is an implementation 800 in which the device 102 includes a wireless speaker and voice activated device 802. The wireless speaker and voice activated device 802 can have wireless network connectivity and is configured to execute an assistant operation. The one or more processors 190 including the audio player 140, the one or more speakers 106, or a combination thereof, are included in the wireless speaker and voice activated device 802.

The wireless speaker and voice activated device 802 is coupled to the one or more sensors 104. In some implementations, the wireless speaker and voice activated device 802 corresponds to the reference 188 and includes the one or more motion sensors 178. The one or more motion sensors 178 are illustrated using dashed lines to indicate internal components that are not generally visible to a user of the wireless speaker and voice activated device 802. In some implementations, the one or more sensors 104, the one or more speakers 106, the one or more spatial sensors 176, or a combination thereof, are integrated in a user head-mounted device (e.g., a headset or earbuds) and the audio player 140 is integrated in the wireless speaker and voice activated device 802. In some implementations, the one or more spatial sensors 176 (e.g., a camera) is integrated in the wireless speaker and voice activated device 802.

During operation, in response to receiving a verbal command identified as user speech via operation of the audio player 140, the wireless speaker and voice activated device 802 can execute assistant operations (e.g., an integrated assistant application). The assistant operations can include adjusting a temperature, playing music, turning on lights, etc. For example, the assistant operations are performed responsive to receiving a command after a keyword or key phrase (e.g., "hello assistant").

FIG. 9 depicts an implementation 900 in which the device 102 includes a portable electronic device that corresponds to a virtual reality, mixed reality, or augmented reality headset 902. The audio player 140, the one or more sensors 104, the one or more speakers 106, the one or more spatial sensors 176, the one or more spatial sensors 178, or a combination thereof, are integrated into the headset 902.

Audio adjustment based on user electrical signals can be performed and the adjusted audio signals can be output via the one or more speakers 106 of the headset 902. A visual interface device is positioned in front of the user's eyes to enable display of augmented reality, mixed reality, or virtual reality images or scenes to the user while the headset 902 is worn. In some implementations, the reference 188 corresponds to a virtual reference that can be displayed by the visual interface device. In a particular example, the visual interface device is configured to display a notification indicating that audio configuration is in progress.

FIG. 10 depicts an implementation 1000 in which the device 102 corresponds to, or is integrated within, a vehicle 1002, illustrated as a manned or unmanned aerial device (e.g., a package delivery drone). The audio player 140, the one or more speakers 106, or a combination thereof, are integrated into the vehicle 1002.

The vehicle 1002 is coupled to the one or more sensors 104. In some implementations, the vehicle 1002 includes the one or more motion sensors 178. In some implementations, the vehicle 1002 corresponds to the reference 188. The one or more motion sensors 178 are illustrated using dashed lines to indicate internal components that are not generally visible to a user of the vehicle 1002. In some implementations, the one or more sensors 104, the one or more speakers 106, the one or more spatial sensors 176, or a combination thereof, are integrated in a user head-mounted device (e.g., a headset or earbuds) and the audio player 140 is integrated in the vehicle 1002. In some implementations, the one or more spatial sensors 176 (e.g., a camera) is integrated in the vehicle 1002. Audio adjustment based on user electrical signals can be performed and the adjusted audio signals can be output via the one or more speakers 106 of the vehicle 1002.

FIG. 11 is a diagram of ear buds 1100 (e.g., another particular example of the device 102 of FIG. 1) operable to perform audio adjustment based on user electrical signals. In FIG. 11, a first ear bud 1102 includes at least one of the one or more spatial sensors 176, and a second ear bud 1104 includes at least one of the one or more spatial sensors 176. Each of the first ear bud 1102 and the second ear bud 1004 also includes at least one of the one or more speakers 106. One or both of the ear buds 1200 may also include the audio player 140, the one or more spatial sensors 178, or a combination thereof.

Figure 12:
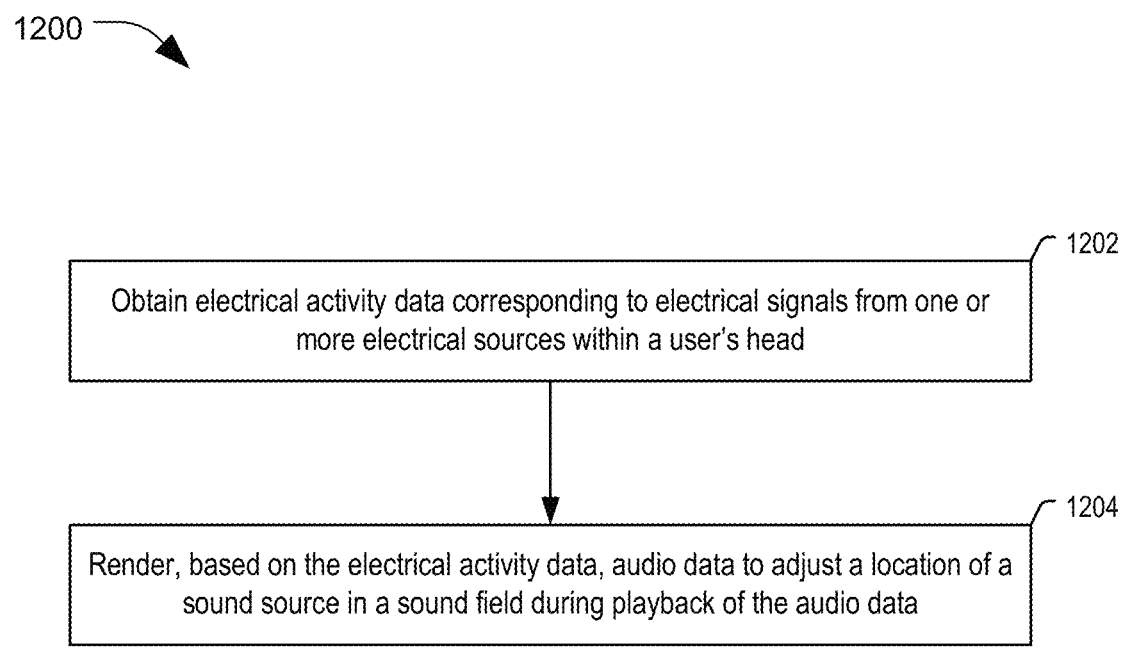
FIG. 12 is a diagram of a particular implementation of a method of adjusting audio based on user electrical signals that may be performed by the device of FIG. 1, in accordance with some examples of the present disclosure.

Referring to FIG. 12, a particular implementation of a method 1200 of adjusting audio based on user electrical signals is shown. In a particular aspect, one or more operations of the method 1200 are performed by at least one of the audio player 140, the audio adjuster 170, the one or more processors 190, the device 102, the system 100 of FIG. 1, or a combination thereof.

The method 1200 includes obtaining electrical activity data corresponding to electrical signals from one or more electrical sources within a user's head, at 1202. For example, the audio player 140 of FIG. 1 obtains the electrical activity data 105 corresponding to electrical signals from the one or more electrical sources 184 within the head 182 of the user 180.

The method 1200 also includes rendering, based on the electrical activity data, audio data to adjust a location of a sound source in a sound field during playback of the audio data, at 1204. For example, the audio player 140 renders, based on the electrical activity data 105, the audio data 141 to adjust a location of the sound source 186 in the sound field 142 during playback of the audio data 141. To illustrate, the audio player 140 generates audio data 141C by rendering the audio data 141A to adjust a location of the sound source 186 from the location 150A to the location 150B in the sound field 142.

The method 1200 thus enables rendering audio with sounds that can be perceived as coming from a direction of the sound source 186 (e.g., the location 150B) that corresponds to the user preferred location 167 or an estimate of the user preferred location 167 (e.g., the relative location 161). As an example, if the user 180 puts the playback device (e.g., the reference 188) on a desk, the location of the sound source 186 can be adjusted to continue to be perceived as coming from in front of the user 180 (e.g., the user preferred location 167).

The method 1200 of FIG. 12 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 1200 of FIG. 12 may be performed by a processor that executes instructions, such as described with reference to FIG. 13.

Figure 13:
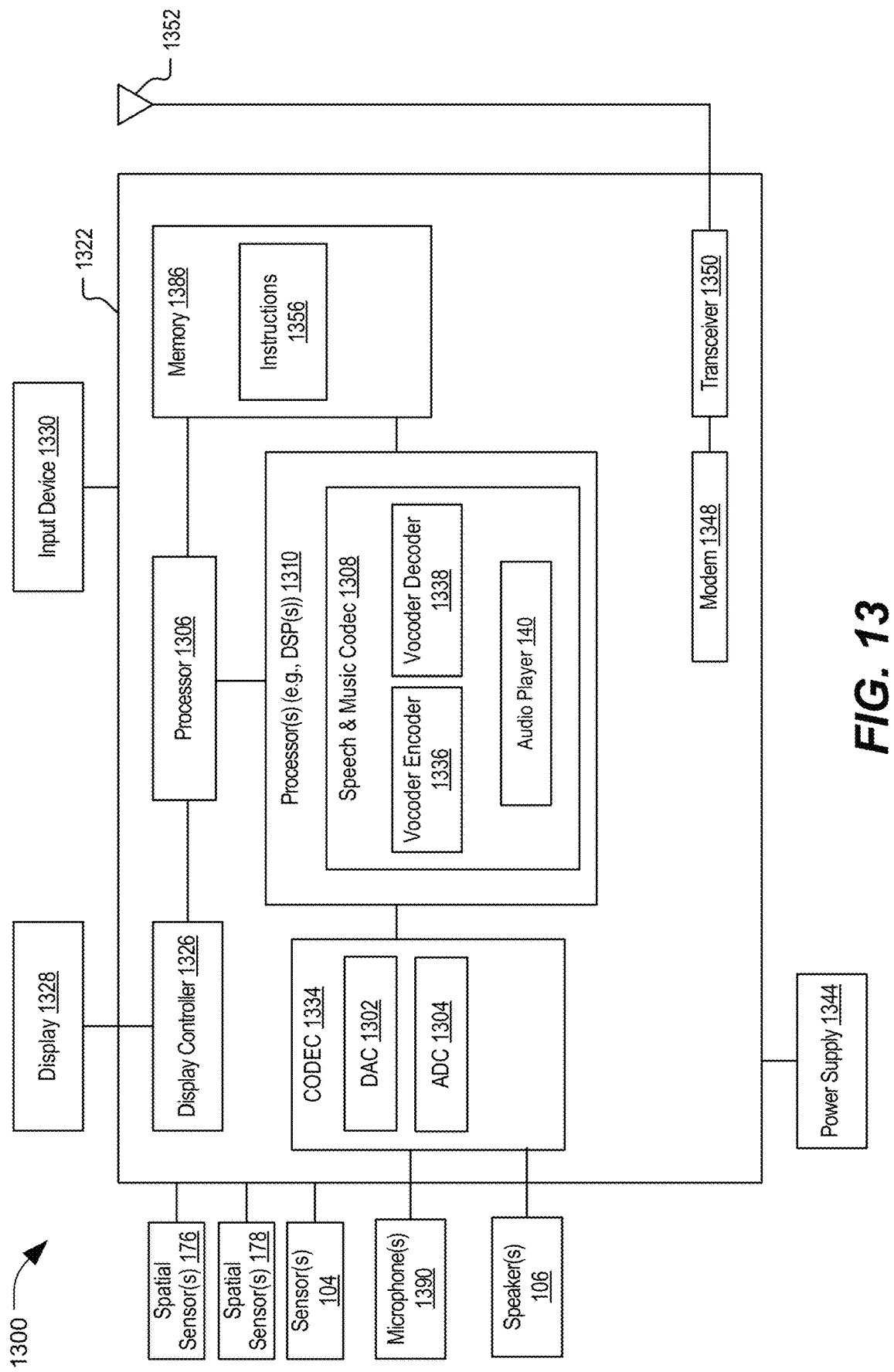
FIG. 13 is a block diagram of a particular illustrative example of a device that is operable to adjust audio based on user electrical signals, in accordance with some examples of the present disclosure.

Referring to FIG. 13, a block diagram of a particular illustrative implementation of a device is depicted and generally designated 1300. In various implementations, the device 1300 may have more or fewer components than illustrated in FIG. 13. In an illustrative implementation, the device 1300 may correspond to the device 102. In an illustrative implementation, the device 1300 may perform one or more operations described with reference to FIGS. 1-12.

In a particular implementation, the device 1300 includes a processor 1306 (e.g., a CPU). The device 1300 may include one or more additional processors 1310 (e.g., one or more DSPs). In a particular aspect, the one or more processors 190 of FIG. 1 correspond to the processor 1306, the processors 1310, or a combination thereof. The processors 1310 may include a speech and music coder-decoder (CODEC) 1308 that includes a voice coder ("vocoder") encoder 1336, a vocoder decoder 1338, the audio player 140, or a combination thereof.

The device 1300 may include a memory 1386 and a CODEC 1334. The memory 1386 may include instructions 1356, that are executable by the one or more additional processors 1310 (or the processor 1306) to implement the functionality described with reference to the audio player 140. The device 1300 may include a modem 1348 coupled, via a transceiver 1350, to an antenna 1352. The device 1300 may include or be coupled to the one or more spatial sensors 176, the one or more spatial sensors 178, the one or more sensors 104, or a combination thereof.

The device 1300 may include a display 1328 coupled to a display controller 1326. The one or more speakers 106 and one or more microphones 1390 may be coupled to the CODEC 1334. The CODEC 1334 may include a digital-to-analog converter (DAC) 1302, an analog-to-digital converter (ADC) 1304, or both. In a particular implementation, the CODEC 1334 may receive analog signals from the one or more microphones 1390, convert the analog signals to digital signals (e.g., the audio data 141A) using the analog-to-digital converter 1304, and provide the digital signals to the speech and music codec 1308. The speech and music codec 1308 may process the digital signals, and the digital signals may further be processed by the audio player 140. In a particular implementation, the speech and music codec 1308 may provide digital signals (e.g., the audio data 141C) to the CODEC 1334. The CODEC 1334 may convert the digital signals to analog signals using the digital-to-analog converter 1302 and may provide the analog signals to the one or more speakers 106. For example, the audio player 140 may, in response to determining that the user 180 is tracking the sound source 186 at the location 150A that is far from or behind the user 180, generate the audio data 141C to adjust the location of the sound source 186 to the location 150B that is closer to or in front of the user 180. The analog signals corresponding to the audio data 141C may be played out via the one or more speakers 106 integrated in a headset or earbuds of the user 180.

In a particular implementation, the device 1300 may be included in a system-in-package or system-on-chip device 1322. In a particular implementation, the memory 1386, the processor 1306, the processors 1310, the display controller 1326, the CODEC 1334, and the modem 1348 are included in the system-in-package or system-on-chip device 1322. In a particular implementation, an input device 1330 and a power supply 1344 are coupled to the system-in-package or system-on-chip device 1322. Moreover, in a particular implementation, as illustrated in FIG. 13, the display 1328, the input device 1330, the one or more speakers 106, the one or more microphones 1390, the antenna 1352, and the power supply 1344 are external to the system-in-package or system-on-chip device 1322. In a particular implementation, each of the display 1328, the input device 1330, the one or more speakers 106, the one or more microphones 1390, the antenna 1352, and the power supply 1344 may be coupled to a component of the system-in-package or system-on-chip device 1322, such as an interface (e.g., the input interface 114 or the output interface 124) or a controller.

The device 1300 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for obtaining electrical activity data corresponding to electrical signals from one or more electrical sources within a user's head. For example, the means for obtaining can correspond to the one or more sensors 104, the input interface 114, the audio player 140, the one or more processors 190, the device 102, the system 100 of FIG. 1, the system 300 of FIG. 3, the processor 1306, the processors 1310, the device 1300, one or more other circuits or components configured to obtain the electrical activity data, or any combination thereof.

The apparatus also includes means for rendering, based on the electrical activity data, audio data to adjust a location of a sound source in a sound field during playback of the audio data. For example, the means for rendering can correspond to the audio player 140, the one or more processors 190, the device 102, the system 100 of FIG. 1, the system 300 of FIG. 3, the processor 1306, the processors 1310, the device 1300, one or more other circuits or components configured to obtain the electrical activity data, or any combination thereof.

In some implementations, a non-transitory computer-readable medium (e.g., a computer-readable storage device, such as the memory 1386) includes instructions (e.g., the instructions 1356) that, when executed by one or more processors (e.g., the one or more processors 190, the one or more processors 1310, or the processor 1306), cause the one or more processors to obtain electrical activity data (e.g., the electrical activity data 105) corresponding to electrical signals from one or more electrical sources (e.g., the one or more electrical sources 184) within a user's head (e.g., the head 182). The instructions, when executed by the one or more processors, cause the one or more processors to render, based on the electrical activity data, audio data (e.g., the audio data 141A) to adjust a location (e.g., the location 150A) of a sound source (e.g., the sound source 186) in a sound field (e.g., the sound field 142) during playback of the audio data (e.g., the audio data 141C).

Particular aspects of the disclosure are described below in sets of interrelated clauses:

According to Clause 1, a device includes: a memory configured to store instructions; and one or more processors configured to execute the instructions to: obtain electrical activity data corresponding to electrical signals from one or more electrical sources within a user's head; and render, based on the electrical activity data, audio data to adjust a location of a sound source in a sound field during playback of the audio data.

Clause 2 includes the device of Clause 1, wherein the one or more processors are further configured to execute the instructions to output the audio data via one or more speakers.

Clause 3 includes the device of Clause 1 or Clause 2, wherein the electrical activity data includes electro-oculogram (EOG) data, electroencephalogram (EEG) data, or both.

Clause 4 includes the device of any of Clause 1 to Clause 3, further including an interface configured to receive the electrical activity data from one or more sensors.

Clause 5 includes the device of Clause 4, wherein the interface includes at least one of an ethernet interface, a universal serial bus (USB) interface, a Wi-Fi interface, a Bluetooth interface, a serial port interface, or a parallel port interface.

Clause 6 includes the device of Clause 4 or Clause 5, wherein the one or more sensors include an in-ear sensor.

Clause 7 includes the device of Clause 4 or Clause 5, wherein the one or more sensors include an electrode cap, a neural implant, a conductive screen, a non-wearable sensor, or a combination thereof.

Clause 8 includes the device of any of Clause 1 to Clause 7, wherein the one or more processors are further configured to execute the instructions to: initiate a first playback operation of the audio data via one or more speakers, the audio data rendered to include multiple locations of the sound source in the sound field during the first playback operation, wherein the electrical activity data is based on the electrical signal from the one or more electrical sources during the first playback operation of the audio data; and determine, based on the electrical activity data, a user preferred location of the sound source, wherein the audio data is rendered based on the user preferred location to adjust the location during a second playback operation of the audio data.

Clause 9 includes the device of Clause 8, wherein the one or more processors are configured to execute the instructions to, based on determining whether a location confidence level is less than a confidence threshold, determine whether to render the audio data to include the multiple locations, wherein the location confidence level is associated with an estimated location of the user relative to a reference.

Clause 10 includes the device of Clause 9, wherein the estimated location of the user relative to the reference includes an estimated orientation of the user relative to an estimated orientation of the reference, an estimated distance of the user relative to the reference, or both.

Clause 11 includes the device of Clause 9 or Clause 10, wherein the reference includes one or more of the device, a display device, a physical reference, or a virtual reference.

Clause 12 includes the device of any of Clause 9 to Clause 11, wherein the one or more processors are configured to execute the instructions to initialize the estimated location to correspond to the reference oriented in front of the user.

Clause 13 includes the device of any of Clause 9 to Clause 12, wherein the one or more processors are configured to initialize the location confidence level to less than the location threshold.

Clause 14 includes the device of any of Clause 9 to Clause 13, wherein the one or more processors are configured to execute the instructions to update an estimated location of the user relative to the reference, the estimated location updated based on inertial measurement unit (IMU) data of a headset of the user, spatial data of the reference, a user gaze estimate, or a combination thereof.

Clause 15 includes the device of any of Clause 1 to Clause 14, wherein the one or more processors are configured to execute the instructions to: determine a user gaze estimate based on the electrical activity data; and update, based on at least in part on the user gaze estimate, an estimated location of the user relative to a reference.

Clause 16 includes the device of any of Clause 1 to Clause 15, wherein the one or more processors are configured to execute the instructions to: process the electrical activity data using a machine learning model to determine a user gaze estimate; and update, based on the user gaze estimate, an estimated location of the user relative to a reference.

Clause 17 includes the device of any of Clause 1 to Clause 16, wherein the one or more processors are further configured to execute the instructions to process the electrical activity data using a machine learning model to determine a user preferred location of the sound source.

Clause 18 includes the device of any of Clause 1 to Clause 17, wherein the one or more processors are further configured to execute the instructions to: render the audio data to include a first location of a speech source and a second location of a non-speech source in the sound field; initiate a first playback operation of the audio data via one or more speakers, wherein the electrical activity data is based on the electrical signals from the one or more electrical sources during the first playback operation; and determine, based on the electrical activity data, a user preferred location of the sound source, wherein the audio data is rendered based on the user preferred location to adjust the location of the sound source during a second playback operation of the audio data.

Clause 19 includes the device of Clause 18, wherein the one or more processors are further configured to execute the instructions to, in response to determining that the electrical activity data indicates that a single sound source is tracked, determine that the user preferred location corresponds to the first location of the speech source.

Clause 20 includes the device of Clause 18 or Clause 19, wherein the one or more processors are further configured to execute the instructions to, in response to determining that the electrical activity data indicates that the speech source and the non-speech source are tracked, determine that the user preferred location corresponds to the second location of the non-speech source.

According to Clause 21, a method includes: obtaining, at a device, electrical activity data corresponding to electrical signals from one or more electrical sources within a user's head; and rendering, based on the electrical activity data, audio data to adjust a location of a sound source in a sound field during playback of the audio data.

Clause 22 includes the method of Clause 21, further including: outputting the audio data via one or more speakers.

Clause 23 includes the method of Clause 21 or Clause 22, wherein the electrical activity data includes electro-oculogram (EOG) data, electroencephalogram (EEG) data, or both.

Clause 24 includes the method of any of Clause 21 to Clause 23, further including receiving the electrical activity data via an interface from one or more sensors.

Clause 25 includes the method of Clause 24, wherein the interface includes at least one of an ethernet interface, a universal serial bus (USB) interface, a Wi-Fi interface, a Bluetooth interface, a serial port interface, or a parallel port interface.

Clause 26 includes the method of Clause 24 or Clause 25, wherein the one or more sensors include an in-ear sensor.

Clause 27 includes the method of Clause 24 or Clause 25, wherein the one or more sensors include an electrode cap, a neural implant, a conductive screen, a non-wearable sensor, or a combination thereof.

Clause 28 includes the method of any of Clause 21 to Clause 27, further including: initiating a first playback operation of the audio data via one or more speakers, the audio data rendered to include multiple locations of the sound source in the sound field during the first playback operation, wherein the electrical activity data is based on the electrical signal from the one or more electrical sources during the first playback operation of the audio data; and determining, based on the electrical activity data, a user preferred location of the sound source, wherein the audio data is rendered based on the user preferred location to adjust the location during a second playback operation of the audio data.

Clause 29 includes the method of Clause 28, further including, based on determining whether a location confidence level is less than a confidence threshold, determining whether to render the audio data to include the multiple locations, wherein the location confidence level is associated with an estimated location of the user relative to a reference.

Clause 30 includes the method of Clause 29, wherein the estimated location of the user relative to the reference includes an estimated orientation of the user relative to an estimated orientation of the reference, an estimated distance of the user relative to the reference, or both.

Clause 31 includes the method of Clause 29 or Clause 30, wherein the reference includes one or more of the device, a display device, a physical reference, or a virtual reference.

Clause 32 includes the method of any of Clause 29 to Clause 31, further including initializing the estimated location to correspond to the reference oriented in front of the user.

Clause 33 includes the method of any of Clause 29 to Clause 32, further including initializing the location confidence level to less than the location threshold.

Clause 34 includes the method of any of Clause 29 to Clause 33, further including updating an estimated location of the user relative to the reference, the estimated location updated based on inertial measurement unit (IMU) data of a headset of the user, spatial data of the reference, a user gaze estimate, or a combination thereof.

Clause 35 includes the method of any of Clause 21 to Clause 34, further including: determining a user gaze estimate based on the electrical activity data; and updating, based on the user gaze estimate, an estimated location of the user relative to a reference.

Clause 36 includes the method of any of Clause 21 to Clause 35, further including: processing the electrical activity data using a machine learning model to determine a user gaze estimate; and updating, based on the user gaze estimate, an estimated location of the user relative to a reference.

Clause 37 includes the method of any of Clause 21 to Clause 36, further including processing the electrical activity data using a machine learning model to determine a user preferred location of the sound source.

Clause 38 includes the method of any of Clause 21 to Clause 37, further including: rendering the audio data to include a first location of a speech source and a second location of a non-speech source in the sound field; initiating a first playback operation of the audio data via one or more speakers, wherein the electrical activity data is based on the electrical signals from the one or more electrical sources during the first playback operation; and determining, based on the electrical activity data, a user preferred location of the sound source, wherein the audio data is rendered based on the user preferred location to adjust the location of the sound source during a second playback operation of the audio data.

Clause 39 includes the method of Clause 38, further including, in response to determining that the electrical activity data indicates that a single sound source is tracked, determining that the user preferred location corresponds to the first location of the speech source.

Clause 40 includes the method of Clause 38 or Clause 39, further including, in response to determining that the electrical activity data indicates that the speech source and the non-speech source are tracked, determining that the user preferred location corresponds to the second location of the non-speech source.

According to Clause 41, a device includes: a memory configured to store instructions; and a processor configured to execute the instructions to perform the method of any of Clause 21 to 40.

According to Clause 42, a non-transitory computer-readable medium stores instructions that, when executed by a processor, cause the processor to perform the method of any of Clause 21 to Clause 40.

According to Clause 43, an apparatus includes means for carrying out the method of any of Clause 21 to Clause 40.

According to Clause 44, a non-transitory computer-readable medium stores instructions that, when executed by one or more processors, cause the one or more processors to: obtain electrical activity data corresponding to electrical signals from one or more electrical sources within a user's head; and render, based on the electrical activity data, audio data to adjust a location of a sound source in a sound field during playback of the audio data.

Clause 45 includes the non-transitory computer-readable medium of Clause 44, wherein the instructions, when executed by the one or more processors, cause the one or more processors to update an estimated location of the user relative to a reference, the estimated location updated based on inertial measurement unit (IMU) data of a headset of the user, spatial data of the reference, a user gaze estimate, or a combination thereof.

Clause 46 includes the non-transitory computer-readable medium of Clause 44 or Clause 45, wherein the instructions, when executed by the one or more processors, cause the one or more processors to: determine a user gaze estimate based on the electrical activity data; and update, based on the user gaze estimate, an estimated location of the user relative to a reference.

Clause 47 includes an apparatus including: means for obtaining electrical activity data corresponding to electrical signals from one or more electrical sources within a user's head; and means for rendering, based on the electrical activity data, audio data to adjust a location of a sound source in a sound field during playback of the audio data.

Clause 48 includes the apparatus of Clause 47, wherein at least one of the means for obtaining or the means for rendering is integrated in a headset, an augmented reality headset, a mixed reality headset, a virtual reality headset, a vehicle, a communication device, a display device, a television, a gaming console, a music player, a radio, a digital video player, a camera, a navigation device, an aerial vehicle, a home automation system, a voice-activated device, a wireless speaker and voice activated device, a portable electronic device, a car, a computing device, an internet-of-things (IoT) device, a mobile device, or any combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
one or more processors configured to:
obtain electrical activity data corresponding to electrical signals from one or more electrical sources within a user's head during a first playback operation of audio data;
determine, based on the electrical activity data, a user preferred location of a sound source in a sound field; and
render, based on the user preferred location of the sound source, audio data to adjust a location of the sound source in the sound field during a second playback operation of the audio data.

2. The device of claim 1, wherein the one or more processors are further configured to output the audio data via one or more speakers.

3. The device of claim 1, wherein the electrical activity data includes electro-oculogram (EOG) data, electroencephalogram (EEG) data, or both.

4. The device of claim 1, further comprising an interface configured to receive the electrical activity data from one or more sensors.

5. The device of claim 4, wherein the interface includes at least one of an ethernet interface, a universal serial bus (USB) interface, a Wi-Fi interface, a Bluetooth interface, a serial port interface, or a parallel port interface.

6. The device of claim 4, wherein the one or more sensors include an in-ear sensor.

7. The device of claim 4, wherein the one or more sensors include an electrode cap, a neural implant, a conductive screen, a non-wearable sensor, or a combination thereof.

8. The device of claim 1, wherein the one or more processors are further configured to:
render the audio data to include multiple locations of the sound source in the sound field during the first playback operation; and
initiate the first playback operation of the audio data via one or more speakers.

9. The device of claim 8, wherein the one or more processors are configured to, based on determining whether a location confidence level is less than a confidence threshold, determine whether to render the audio data to include the multiple locations, wherein the location confidence level is associated with an estimated location of the user relative to a reference.

10. The device of claim 9, wherein the estimated location of the user relative to the reference includes an estimated orientation of the user relative to an estimated orientation of the reference, an estimated distance of the user relative to the reference, or both.

11. The device of claim 9, wherein the reference includes one or more of the device, a display device, a physical reference, or a virtual reference.

12. The device of claim 9, wherein the one or more processors are configured to initialize the estimated location to correspond to the reference oriented in front of the user.

13. The device of claim 9, wherein the one or more processors are configured to initialize the location confidence level to less than the confidence threshold.

14. The device of claim 9, wherein the one or more processors are configured to update an estimated location of the user relative to the reference, the estimated location updated based on inertial measurement unit (IMU) data of a headset of the user, spatial data of the reference, a user gaze estimate, or a combination thereof.

15. The device of claim 1, wherein the one or more processors are configured to:
determine a user gaze estimate based on the electrical activity data; and
update, based at least in part on the user gaze estimate, an estimated location of the user relative to a reference.

16. The device of claim 1, wherein the one or more processors are configured to:
process the electrical activity data using a machine learning model to determine a user gaze estimate; and
update, based on the user gaze estimate, an estimated location of the user relative to a reference.

17. The device of claim 1, wherein the one or more processors are further configured to process the electrical activity data using a machine learning model to determine the user preferred location of the sound source.

18. The device of claim 1, wherein the one or more processors are further configured to:
render the audio data to include a first location of a speech source and a second location of a non-speech source in the sound field; and
initiate the first playback operation of the audio data via one or more speakers.

19. The device of claim 18, wherein the one or more processors are further configured to, in response to determining that the electrical activity data indicates that a single sound source is tracked, determine that the user preferred location corresponds to the first location of the speech source.

20. The device of claim 18, wherein the one or more processors are further configured to, in response to determining that the electrical activity data indicates that the speech source and the non-speech source are tracked, determine that the user preferred location corresponds to the second location of the non-speech source.

21. A method comprising:
obtaining, at a device, electrical activity data corresponding to electrical signals from one or more electrical sources within a user's head;
processing the electrical activity data using a machine learning model to determine a user gaze estimate;
updating, based on the user gaze estimate, an estimated location of the user relative to a reference; and
rendering, based at least in part on the estimated location of the user relative to the reference, audio data to adjust a location of a sound source in a sound field during playback of the audio data.

22. The method of claim 21, further comprising:
initiating a first playback operation of the audio data via one or more speakers, the audio data rendered to include multiple locations of the sound source in the sound field during the first playback operation, wherein the electrical activity data is based on the electrical signals from the one or more electrical sources during the first playback operation of the audio data; and
determining, based on the electrical activity data, a user preferred location of the sound source, wherein the audio data is rendered based on the user preferred location to adjust the location during a second playback operation of the audio data.

23. The method of claim 22, further comprising, based on determining whether a location confidence level is less than a confidence threshold, determining whether to render the audio data to include the multiple locations, wherein the location confidence level is associated with the estimated location of the user relative to the reference.

24. The method of claim 23, wherein the estimated location of the user relative to the reference includes an estimated orientation of the user relative to an estimated orientation of the reference, an estimated distance of the user relative to the reference, or both.

25. The method of claim 23, wherein the reference includes one or more of the device, a display device, a physical reference, or a virtual reference.

26. A non-transitory computer-readable medium storing instructions that, when executed by one or more processors, cause the one or more processors to:
obtain electrical activity data corresponding to electrical signals from one or more electrical sources within a user's head;
process the electrical activity data using a machine learning model to determine a user preferred location of a sound source in a sound field; and
render, based at least in part on the user preferred location, audio data to adjust a location of the sound source in the sound field during playback of the audio data.

27. The non-transitory computer-readable medium of claim 26, wherein the instructions, when executed by the one or more processors, cause the one or more processors to update an estimated location of the user relative to a reference, the estimated location updated based on inertial measurement unit (IMU) data of a headset of the user, spatial data of the reference, a user gaze estimate, or a combination thereof.

28. The non-transitory computer-readable medium of claim 26, wherein the instructions, when executed by the one or more processors, cause the one or more processors to:
determine a user gaze estimate based on the electrical activity data; and
update, based on the user gaze estimate, an estimated location of the user relative to a reference.

29. An apparatus comprising:
means for rendering audio data to include a first location of a speech source and a second location of a non-speech source in a sound field during a first playback operation of the audio data;
means for obtaining electrical activity data corresponding to electrical signals from one or more electrical sources within a user's head during the first playback operation;
means for determining, based on the electrical activity data, a user preferred location of a sound source in the sound field; and
means for rendering, based at least in part on the user preferred location, the audio data to adjust a location of the sound source in the sound field during a second playback operation of the audio data.

30. The apparatus of claim 29, wherein at least one of the means for rendering the audio data, the means for obtaining the electrical activity data, the means for determining the user preferred location of the sound source, or the means for rendering the audio based at least in part on the user preferred location is integrated in a headset, an augmented reality headset, a mixed reality headset, a virtual reality headset, a vehicle, a communication device, a display device, a television, a gaming console, a music player, a radio, a digital video player, a camera, a navigation device, an aerial vehicle, a home automation system, a voice-activated device, a wireless speaker and voice activated device, a portable electronic device, a car, a computing device, an internet-of-things (IoT) device, a mobile device, or any combination thereof.

* * * * *